(12) United States Patent
Nof et al.

(10) Patent No.: US 12,050,511 B2
(45) Date of Patent: Jul. 30, 2024

(54) EFFICIENT FAULT PREVENTION AND REPAIR IN COMPLEX SYSTEMS

(71) Applicant: Purdue Research Foundation, West Lafayette, IN (US)

(72) Inventors: Shimon Nof, West Lafayette, IN (US); Xin Chen, Glen Carbon, IL (US)

(73) Assignee: Purdue Research Foundation, West Lafayette, IN (US)

( * ) Notice: Subject to any disclaimer, the term of this patent is extended or adjusted under 35 U.S.C. 154(b) by 139 days.

(21) Appl. No.: 17/782,083

(22) PCT Filed: Dec. 2, 2020

(86) PCT No.: PCT/US2020/062887
§ 371 (c)(1),
(2) Date: Jun. 2, 2022

(87) PCT Pub. No.: WO2021/113360
PCT Pub. Date: Jun. 10, 2021

(65) Prior Publication Data
US 2023/0021610 A1    Jan. 26, 2023

Related U.S. Application Data

(60) Provisional application No. 62/942,259, filed on Dec. 2, 2019.

(51) Int. Cl.
*G06F 11/00*    (2006.01)
*G06F 11/07*    (2006.01)

(52) U.S. Cl.
CPC ........ *G06F 11/0793* (2013.01); *G06F 11/073* (2013.01); *G06F 11/0787* (2013.01)

(58) Field of Classification Search
CPC ............... G06F 11/0793; G06F 11/073; G06F 11/0787; G06F 11/0709; G06F 11/3006; G06F 11/0703
See application file for complete search history.

(56) References Cited

U.S. PATENT DOCUMENTS 7,200,525 B1 *  4/2007  Williams .............. G06F 11/008
                                                714/E11.02
8,069,370 B1 * 11/2011  Li ........................ G06F 11/079
                                                714/26

(Continued)

OTHER PUBLICATIONS

International Search Report and Written Opinion corresponding to International Patent Application No. PCT/US2020/062887, dated Feb. 1, 2021 (13 pages).

*Primary Examiner* — Joseph D Manoskey
(74) *Attorney, Agent, or Firm* — Maginot, Moore & Beck LLP

(57) ABSTRACT

A method of supervising a complex system includes acquiring and storing failures data and repair resources information regarding the complex system, identifying failure networks and structures of the complex system. Failure types associated with the failure networks of the complex system are determined. The method includes generating a plurality of failure prevention and repair (FPR) sequences, wherein each FPR is associated with the failure networks and the failure types. The generated FPR sequences are analyzed to select a set of FPR sequences and associated repair resources. The method further comprises applying the selected one of the plurality of failure prevention and repair sequences to the complex system, thereby managing the complex system.

12 Claims, 5 Drawing Sheets

(56) References Cited

U.S. PATENT DOCUMENTS

| | | |
|---|---|---|
| 2012/0005532 A1 | 1/2012 | Li et al. |
| 2012/0130767 A1 | 5/2012 | McMullin |
| 2013/0232094 A1 | 9/2013 | Anderson et al. |
| 2014/0129272 A1 | 5/2014 | Hanley |
| 2014/0129876 A1* | 5/2014 | Addepalli ........... H04L 41/0677 |
| | | 714/E11.029 |
| 2014/0198630 A1* | 7/2014 | Nof ........................ H04L 45/28 |
| | | 370/216 |
| 2014/0288992 A1 | 9/2014 | Wetzer et al. |
| 2022/0066853 A1* | 3/2022 | He ...................... G06F 11/0709 |

\* cited by examiner

EFFICIENT FAULT PREVENTION AND REPAIR IN COMPLEX SYSTEMS

This application claims the benefit of U.S. provisional patent application Ser. No. 62/942,259, filed Dec. 2, 2019, which is incorporated in its entirety herein by reference.

FIELD OF THE INVENTION

The present invention relates generally sequencing fault prevention in complex systems, for example, electrical power grid systems, supply networks, healthcare system, among others.

BACKGROUND

Faults (or failures) are unavoidable in complex systems such as supply networks, smart grids, and healthcare systems. Faults have major cost implications and can cause catastrophic events. For instance, the annual cost of power interruptions in the U.S. is estimated between $22 and $135 billion (LaCommare and Eto, 2004) and is increasing; a healthcare insurance company covering 10 million members is estimated to pay $400 million a year in overpayments (Anand and Khots, 2008) due to unintentional (mistakes made by patients, providers, and insurance companies) and intentional errors (fraudulent claims). Many faults in a system are caused by a few faulty sources which require repair; other faults are repaired once the faulty sources are repaired. For instance, products flow from supplier A to customer B in a supply network. A fault occurs if B does not receive certain products by a predetermined time. This fault, however, is often caused by faults at A or other manufacturing and distribution entities along the path from A to B. The fault at B is repaired if other faulty entities are repaired. Similarly, a fault occurs in a smart grid if a bus cannot provide electricity to a customer. If the bus itself is damaged, it must be repaired. It is also possible that the fault at the bus is caused by faults at generators, transmission lines, distribution lines, and/or transformers; the fault is repaired if other faulty components are repaired. The goal of this research is to design efficient fault prevention and repair (FPR) sequencers to prevent faults from occurring and minimize their damage.

An FPR sequencer determines which faults are to be repaired first and which faults are to be repaired next. The cost of faults includes repair cost and damage caused by faults. Because all faulty sources must be repaired, the repair cost of faulty sources may be assumed to be the same regardless of the sequence of repairs. The damage caused by a fault is often proportional to the time for which the fault exists, which depends on the FPR sequencer. A fault causes less damage if it is repaired early. A complex system has multiple faults and there may be a crippling or cascading effect when a few sources become faulty.

Research on efficient fault repair and infrastructure recovery focused mostly on smart grids and highway systems. For example, power-flow models were developed (Ang, 2006; Salmeron et al., 2004) to identify optimal or near-optimal repair sequences for electrical power grids. Fault repair is part of fault management, in which the state-of-the-art development is automated fault detection and diagnostics (Chen and Nof, 2012, 2014, 2015; Nof and Chen, 2015, 2017). An example of fault management is the emergence of the smart grid, which is a form of electricity network that utilizes digital technology and has the self-detection and self-diagnostics ability. Organizations such as the Electric Power Research Institute (EPRI) have invested heavily in grid operations and planning to help improve real-time situation awareness, wide area protection and control performance, and the capability to handle extreme events and restore the system (EPRI, 2012). The issue of how to prevent and repair faults with an optimal sequence is important but largely left open (Ang, 2006; Jin et al., 2018). The FPR problem is prevalent in many systems. Hospitals are entangled in insurance claim denials due to various faults in the claim process. Insurance companies are concerned about faults in claims and take a conservative approach in processing claims. For instance, FICO (FICO, 2012) developed the Insurance Fraud Manager to detect fraud, abuse, and error in healthcare claims before payment. The result is an unreasonably long delay for many justified payments. One reason for this costly but common practice is that faults are not efficiently corrected after they are detected.

Many systems may be described with mathematical models, e.g., the "scale-free network" depicts electrical power grids (Barabasi and Albert, 1999) and the "random network" depicts transportation networks (Barabasi, 2002; Chen, 2009; Jeong, 2003). Since faulty components are part of a system, mathematical models of systems may be adapted to depict fault networks. Most methods developed earlier exclusively deal with the repair of a single fault (e.g., Dimitrov et al., 2004; Sim and Endrenyi, 1993). Limited research (Ang, 2006; Salmeron et al., 2004) focused on optimal repair sequences. Models of fault networks and fault prevention through repair have not been studied. Previous research (Alizadeh and Sriramula, 2017; Chen, 2009; Chen and Nof, 2012; Sanislav et al., 2018) suggested tools to effectively detect, diagnose, and predict multiple faults (conflicts and errors). Given a network of faults which have been detected, diagnosed, or predicted, this research aims at modeling the fault network and designing the FPR sequencers to prevent faults and minimize the total damage.

The methodology applied in this research is also part of the effort to control network operations through structural search (Dawande et al., 2011). Structural search is a process to search for useful subsets of nodes in a network. For instance, to fight terrorism and prevent epidemic spread through populations with limited resources, critical nodes in a terrorist network or a population must be identified for removal or isolation to disrupt information or disease diffusion. For another example, to promote healthy behaviors in social networks (Parsa and Chen, 2013), a subset of a population, i.e., an influential set of opinion leaders and innovators, needs to be identified to maximize the speed and scale of promotion. The primary goal in structural search is to identify useful structures in networks. In addition, the sequence of operations is of great importance. For example, which node in a terrorist network is removed first and which one is removed next have significant impact on terrorist activities. With regard to an FPR sequencer, the useful structure, i.e., a fault network, is known and comprises all faulty sources and other affected faulty nodes. The sequence of repair, however, needs to be determined. Efficient FPR sequencers designed in this research help advance our understanding of optimizing operations sequences for a useful structure.

There is a need, therefore for efficient FPR sequencing.

SUMMARY

At least some embodiments described herein of address the foregoing need by providing an FPR sequencer that uses defined fault networks to determine prevention and/or repair sequences that reduce damage from failures and help prevent the costliest failures.

One embodiment is a non-transitory computer-readable medium encoded with a computer-readable program which, when executed by a processor, will cause a computer to execute a method of managing an electrical smart grid. The method includes acquiring the failures data, the repair resources information, the plurality of failure prevention goals, and the plurality of failure repair goals from the electrical smart grid. The method also includes supervising the electrical smart grid based on such information.

The supervising includes identifying failure networks and structures of the electrical smart grid, and determining failure types associated with the failure networks of the electrical smart grid. The supervising further includes generating a plurality of failure prevention and repair sequences, a plurality of failure prevention goals, and a plurality of failure repair goals. Each failure prevention and repair sequence of the plurality of failure prevention and repair sequences is associated with the failure networks and the failure types. The supervising further includes emulating the plurality of failure prevention and repair sequences.

Such emulation includes using failures data and repair resources information acquired from a memory device system, and analyzing the plurality of failure prevention and repair sequences to determine and select a set of failure prevention and repair sequences and associated repair resources to achieve the plurality of failure prevention goals and the plurality of failure repair goals. The emulation further includes validating the set of failure prevention and repair sequences and the associated repair resources, thereby producing a validated set of failure prevention and repair sequences and validated associated repair resources. The method also includes applying the validated set of failure prevention and repair sequences and the validated associated repair resources to the electrical smart grid, thereby managing the electrical smart grid. The method also includes updating the failure networks and structures, the plurality of failure prevention and repair sequences, and the associated repair resources of the electrical smart grid.

In some embodiments a system includes a failure network modeler, and a sequencer. The failure network modeler generates a failure network model identifying a plurality of nodes associated with at least one failure node, the failure network further includes a plurality of failure nodes. The sequencer is configured to generate an FPR sequence based on the failure network and one or more parameters. The system further causes at least one generated FPR sequence to be displayed or transmitted to a device having a display.

The above described features and advantages, as well as others, will become more readily apparent to those of ordinary skill in the art by reference to the following detailed description and accompanying drawings.

BRIEF DESCRIPTION OF THE DRAWINGS

FIG. 3b shows a block diagram of a fault network of the exemplary system network of FIG. 3a;

FIG. 3c shows a block diagram of another fault network of the exemplary system network of FIG. 3a;

DETAILED DESCRIPTION

Figure 1:
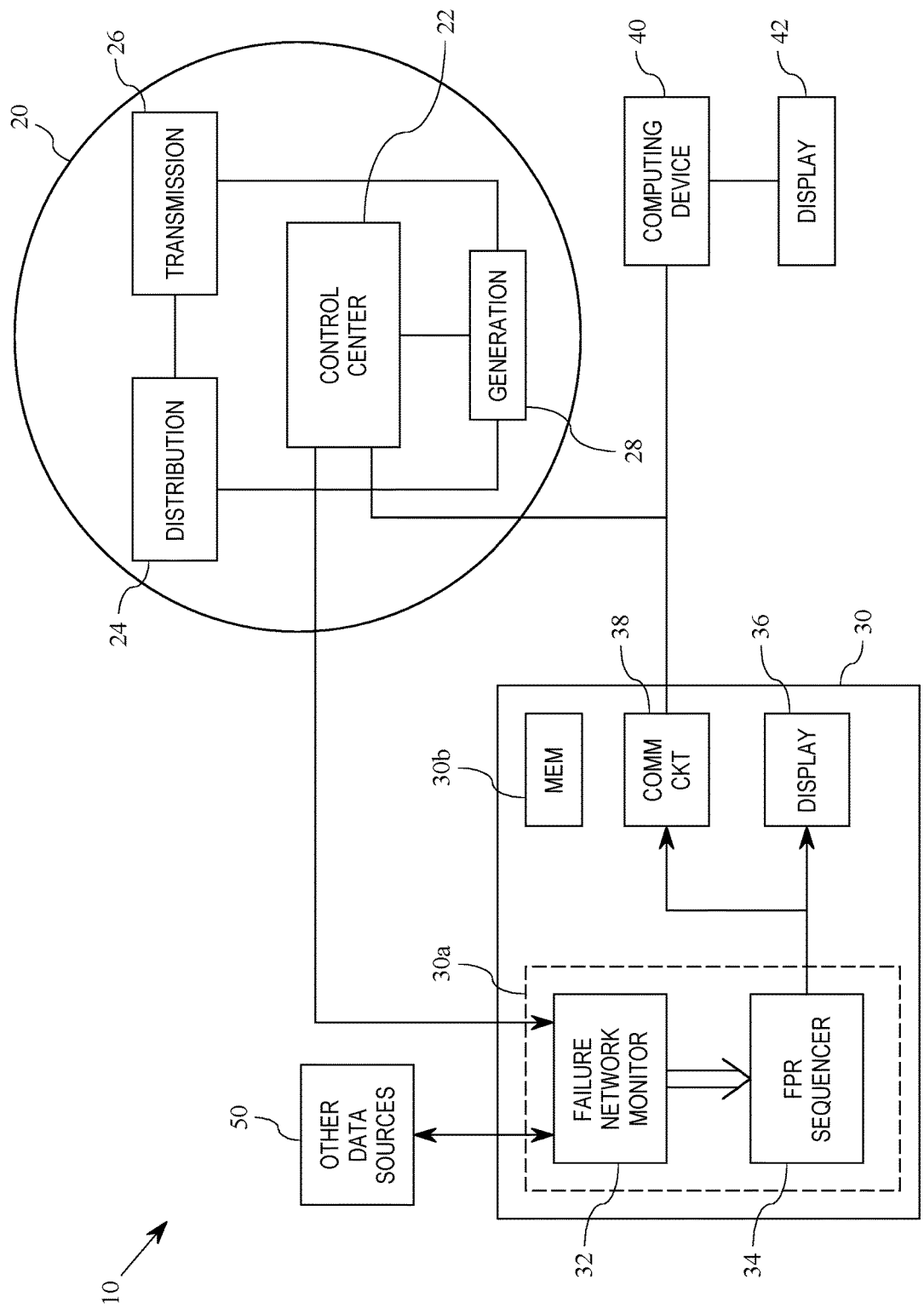
FIG. 1 shows a block diagram of an exemplary system that incorporates an FPR sequence system according to at least one embodiment.

FIG. 1 shows a block diagram of an exemplary system 10 that incorporates an embodiment, and which can carry out the operations describe herebelow. The system 10 includes a smart grid 20, an FPR sequence system 30, at least one remote computing device 40 and associated display 42, and at least one other data source 50. The smart grid 20, as is known in the art, is an electrical grid (delivering electrical energy to end users) which includes a variety of operation and energy measures including smart meters, smart appliances, renewable energy resources, and energy efficient resources. The smart grid 20 includes, among other things, a control center 22 configured to communicate and/or provide at least some control over energy distribution systems 24, energy transmission systems 26, and energy generation system 28. The control center 22 maintains, among other things, information regarding current and past failures in the smart grid components.

The FPR sequence system 30 includes failure network model generator 32, an FPR sequencer 34, a display 36 and a communication circuit 38. Electronic power conditioning and control of the production and distribution of electricity are important aspects of the smart grid. The failure network modeler 32 generates a failure network model identifying a plurality of nodes associated with at least one failure node. As will be discussed below in detail, the failure network model includes a plurality of failure nodes. The sequencer 34 is configured to generate multiple FPR sequences, each of which is a schedule of the allocation of repair resources to the failure nodes, based on the failure network model and one or more parameters. The system further causes at least one generated FPR sequence to be displayed on display 36 or transmitted via communication circuit 38 to a device having a display, for example, the remote computer device 40, or even back to the control center 22 of the smart grid.

The FPR sequence system 30 may include a general purpose computer or other computing device that executes program instructions to perform the operations of the failure network modeler 32 and the FPR sequencer 34, as well as other operations described further below. To this end the FPR sequence system 30 includes a processing circuit 30a, and memory 30b, among other things. The memory 30b is or includes, among other things, a non-transitory computer-readable medium encoded with a computer-readable program which, when executed by a processor of the processing circuit 30a, will carry out the operations of the failure network modeler 32, the FPR sequencer 34, as well as others as described below in connection with FIG. 2. The memory 30b further stores data created and or used by the failure network modeler 32 and the FPR sequencer 34 during the operations described herein.

Figure 2:
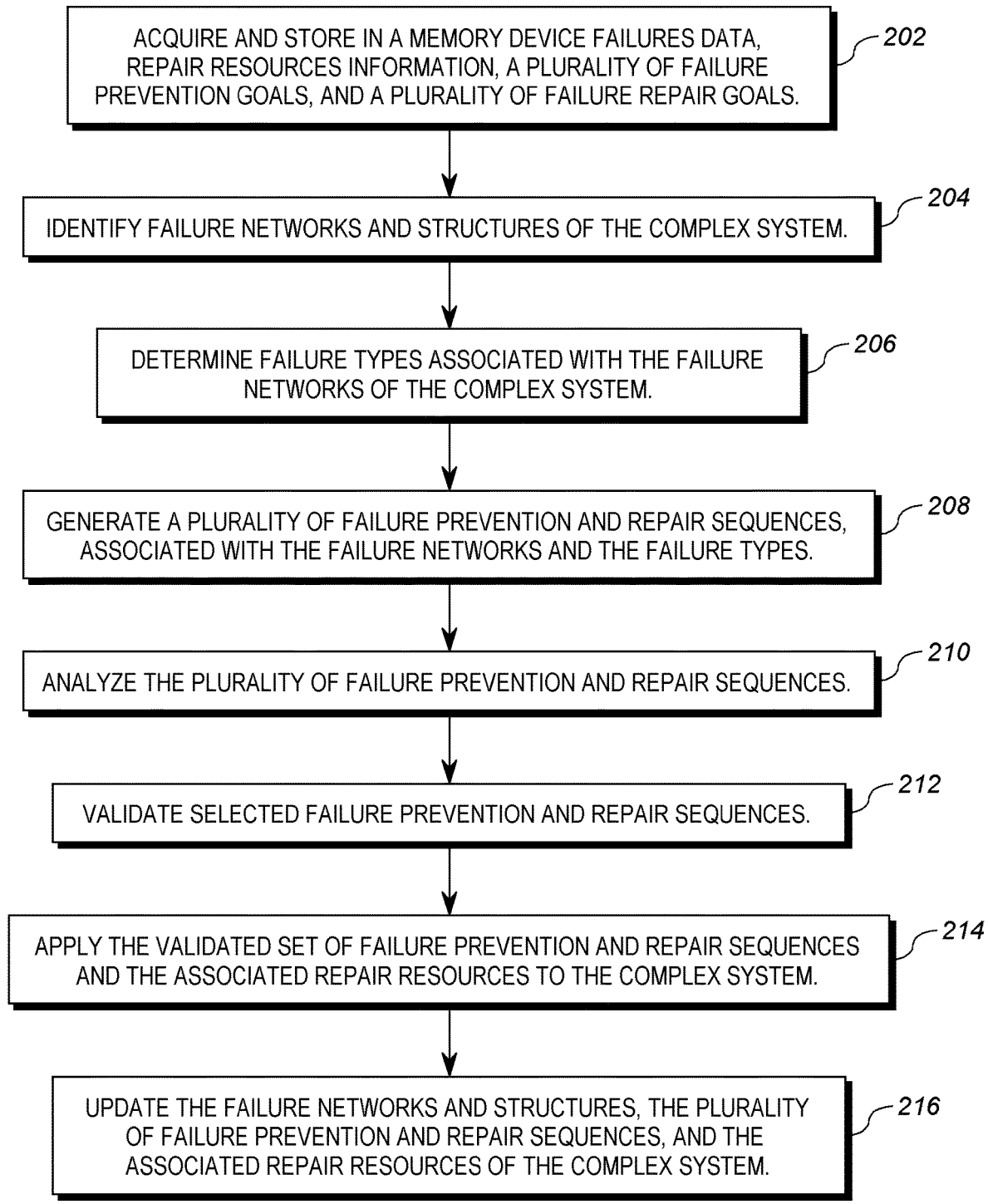
FIG. 2 shows a flow diagram of operations carried out by the FPR sequence system of FIG. 1.

The embodiment of FIG. 1 operates to identify failure networks and to define FPR sequences for such networks. To this end, FIG. 2 shows a flow diagram of operations carried out by the FPR sequence system 30 of FIG. 1 to identify failure networks and define FPR sequences.

Failure networks can be defined using a set of values. The nomenclature of those values and the values used in defining FPR sequences is set forth below in Table 1.

TABLE 1

| | |
|---|---|
| $\gamma$ | Exponent of a power law function |
| $\delta^{IN}$ and $\delta_j^{IN}$ | IN degree of a node |
| $\delta^{OUT}$ and $\delta_j^{OUT}$ | OUT degree of a node |
| $c_j$ | Time at which a node $v_j$ is repaired or prevented |
| d | Degree of a node |
| $d_l$ | Damage caused by a leaf node $v_l$ over one time unit |
| $\bar{d}$ | Mean degree of nodes in a network |
| $\bar{d}_l$ | Mean damage caused by multiple leaf nodes $v_l$'s over one time unit |
| i and i' | Index of internal nodes |
| j and j' | Index of nodes |
| l and l' | Index of leaf nodes |
| $m_r$ | Repair time for a root node $v_r$ |
| n | The total number of nodes in a network |
| $n_l$ | The number of root nodes connected to a leaf node $v_l$ |
| $n_r$ | The number of leaf nodes connected to a root node $v_r$ |
| p | The probability that a pair of nodes are connected |
| r and r' | Index of root nodes |
| t | Time |
| $t_0$ | Time at which the FPR sequence begins |
| $t_c$ | Current time |
| $t_i, t_i', t_j, t_j', t_l, t_l', t_r,$ and $t_r'$ | Time at which a node becomes faulty |
| $v_i$ and $v_i'$ | Internal node in $G(V^F, A^F)$ |
| $v_j$ and $v_j'$ | Node in $G(V^F, A^F)$ |
| $v_l$ and $v_l'$ | Leaf node in $G(V^F, A^F)$ |
| $v_r$ and $v_r'$ | Root node in $G(V^F, A^F)$ |
| A | Set of arcs in $G(V, A)$ |
| $A^F$ | Set of arcs in $G(V^F, A^F)$ |
| D | Total damage |
| FPR | Fault Prevention and Repair |
| FPR-C | Centralized FPR sequencer |
| FPR-DD | Decentralized FPR sequencer minimizing total damage |
| FPR-DP | Decentralized FPR sequencer minimizing preventability |
| FPR-DR | Decentralized FPR sequencer randomly selecting faults for simultaneous repairs |
| G(V, A) | Directed network of faulty nodes |
| $G(V^F, A^F)$ | Directed fault network including pseudo nodes |
| G(W, Ł) | Network (graph) that represents a complex system |
| I | Set of internal nodes |
| L | Set of leaf nodes |
| Ł | Set of links in G(W, Ł) |
| MRT | Maximum Required Total Repair Resources |
| R | Set of root nodes |
| V | Set of nodes in G(V, A) |
| $V^F$ | Set of nodes in $G(V^F, A^F)$ |
| W | Set of nodes in G(W, Ł) |

Modeling Fault Networks

Figure 3A:
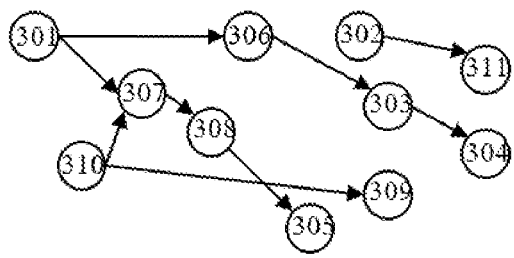
FIG. 3a shows a block diagram depiction of an exemplary system network on which the method of FIG. 2 may be used.
Figure 3B:
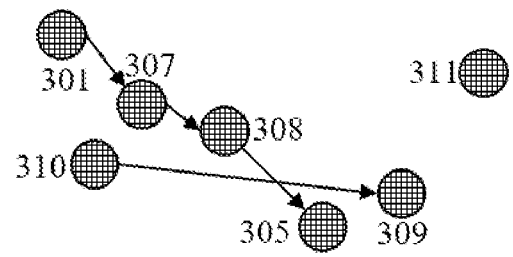

Reference is made to FIGS. 3a and 3b for an explanation of examples of failure networks defined in accordance with the present invention. FIG. 3a depicts a system network 320 with eleven nodes 301-311. FIG. 3b depicts a fault network 322 of seven faulty nodes 301, 305, 307, 308, 309, 310, 311 from in the system 320 described in FIG. 3a. As will be discussed in connection with FIG. 2, further below, the failure networks are generated by the failure network modeler 32.

In general, nodes in a complex system represent machines, equipment, workstations, computers, generators, control units, and other components each of which is modeled as a separate entity. Links between nodes represent the flow of products, services, or information. In the smart grid example of FIG. 1, nodes can include individual power generating devices of the generating system 28, substations of the distribution system 24, and individual customer electrical systems, among other things. Links between nodes define the flow of power from the generating systems 28 to the end users.

Referring again to the example of FIGS. 3a and 3b, nodes are linked directly or indirectly. If a node j is linked to a node j' directly, there is an arc 306 or an edge 306 between the two nodes. When two nodes j and j' are linked indirectly, there is at least one path between j and j' through other nodes so that products, services, or information can be transmitted from j to j' and/or from j' to j. When two nodes are not linked, there is no path between the two nodes. Arcs are directed links and edges are undirected links (Chen and Nof, 2007, 2010, 2012). A fault network is a network of faulty nodes in a system. For a given system, any fault network is a subset of the system network. A system network is the network that describes the system. In a fault network, an edge between two nodes j and j' indicates that a fault at j causes a fault at j' and vice versa; an arc from j to j' indicates that a fault at j causes a fault at j'.

The number of arcs connected to a faulty node is the degree of the node (Angeles Serrano and De Los Rios, 2007; Dorogovtsev et al., 2001). The IN degree, $\delta^{IN}$, of a faulty node is the number of arcs that point at the node. The OUT degree, $\delta^{OUT}$, of a faulty node is the number of arcs that originate from the node. Faulty nodes in a network belong to three groups: leaf, internal, and root nodes. A faulty node j is (a) a root node if its fault is not caused by fault(s) at any other faulty node, i.e., $\delta_j^{IN}=0$; (b) a leaf node if it does not cause fault(s) at any other faulty node, i.e., $\delta_j^{OUT}=0$; and (c) an internal node when $\delta_j^{IN}>0$ and $\delta_j^{OUT}>0$. A faulty node j is both a root and a leaf node if $\delta_j^{IN}=\delta_j^{OUT}=0$; this node is an orphan node because it is not connected to any other nodes. A root node requires repair; an internal or a leaf node is repaired or prevented (from having a failure) if and only if all its causes are repaired or prevented.

In FIG. 3b, nodes 301, 310, and 311 are root nodes and require repair; nodes 307 and 308 are internal nodes; and nodes 305, 309, and 311 are leaf nodes. The total cost of FPR includes repair cost and damage caused by faulty nodes. Repair cost incurs for all root nodes. All faulty nodes could cause damage, but the damage is reflected on leaf nodes which form an interface between the system and its environment. For instance, a bus in a smart grid that directly supplies electricity to households is a leaf node; a fault at the node causes damage to the households. In FIG. 3b, damage caused by faulty nodes 301, 305, 307, 308, 309, 310, and 311 is reflected on leaf nodes 305, 309, and 311.

Figure 3C:
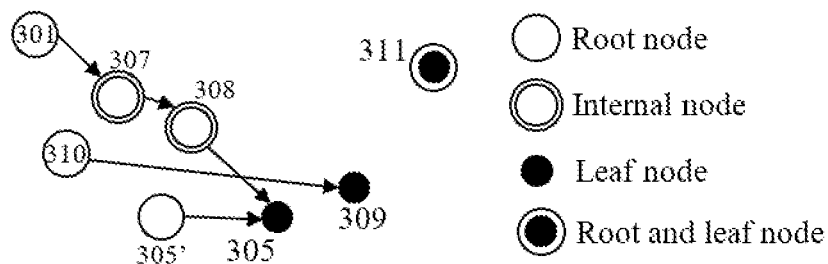

A fault at an internal or leaf node may be partly caused by faults at other faulty nodes and partly due to faults that occur locally. Suppose the fault at node 305 in FIG. 3b is partly caused by node 308 and partly due to a fault that occurs locally. FIG. 3b does not show that node 305 also requires repair. To address this issue, FIG. 3c shows another depiction of the fault network 330 that clarifies repair requirements by incorporating a pseudo node 305' for node 305. Node 305' does not exist in the original system; it is a root node and requires repair. There are four root nodes (301, 310, 311, and 305'), two internal nodes (307 and 308), and three leaf nodes (305, 309, and 311) in FIG. 3c. Node 311 is both a root and leaf node. Many state-of-the-art complex systems such as the smart grid have self-detection and self-diagnostics ability, which provides necessary and sufficient information to help identify fault networks.

Three networks may be defined. Let G (W, Ł) represent a complex system where W is a set of nodes (vertices) and Ł is a set of links in the system. |W| is the total number of nodes in W. |W| is an integer and |W|>0. Since faulty nodes are usually linked through arcs, let G (V, A) represent a directed network of faulty nodes in the system where V is a set of faulty nodes and A is a set of arcs. |V| is the total number of faulty nodes in V. |V| is an integer and |V|≥0. V∈W, A∈Ł, and |V|≤|W|. Let $G(V^F, A^F)$ represent a directed fault network including pseudo nodes. $|V^F| \geq |V|$, $V^F \cap W = V$, and $A^F \cap Ł = A$. $|V^F|$ is an integer and $|V^F| \geq 0$. There are three types of nodes $v_j$'s, $v_{j'} \in V^F$: root nodes $v_r$'s, internal nodes $v_i$'s, and leaf nodes $v_l$'s. Let R, I, and L represent a set of root nodes $v_r$'s, internal nodes $v_i$'s, and leaf nodes $v_l$'s, respectively. |R|, |I|, and |L| are integers. |R|≥0; |I|≥0; and |L|≥0. Any FPR sequence must repair all root nodes $v_r$'s. $v_i$'s and $v_l$'s are repaired or prevented if and only if $v_r$'s are repaired. Depending on when $v_r$'s are repaired, $v_i$'s and $v_l$'s may be prevented. Time zero, i.e., t=0, is defined to help evaluate the FPR sequences. In practice, the time at which the first fault occurs is often defined as t=0. Let $t_c$ represent current time and $t_j$ represent the time $V_j$ becomes faulty; $t_c$, $t_j \geq 0$. Suppose $t_{10} < t_c < t_9$ in FIG. 3c. Since $v_9$ has not become faulty at $t_c$, $v_9$ is prevented if $v_{10}$ is repaired before $t_9$. A fault at a root node cannot be prevented because it has already occurred. For any two nodes $v_j$ and $V_{j'}$, j≠j', $(v_j, v_{j'}) \in A^F$ if $v_j$ directly causes $v_{j'}$. This also implies that $t_j \leq t_{j'}$.

COROLLARY 1: In a directed network G $(V^F, A^F)$ of faulty nodes, $t_j \leq t_{j'}$ if $(v_j, v_{j'}) \in A^F$. All $v_i$'s and $v_l$'s, $V_i \in I$ and $V_l \in L$, are repaired or prevented if and only if all $v_r$'s, $V_r \in R$, are repaired. R∪I∪L=$V^F$. $|R| \leq |V^F|$, $|I| \leq |V^F|$, and $|L| \leq |V^F|$. $|R|+|I|+|L| \geq |V^F|$.

Many network structures are available and may be used to model complex systems and fault networks. A random network (Erdos and Renyi, 1959; Solomonoff and Rapoport, 1951) follows a degree distribution $$\binom{n-1}{d} p^d (1-p)^{n-1-d},$$

wherein n is the total number of nodes, d is the degree of a node or the number of links (arcs or edges) connected to the node, and p is the probability that a pair of nodes are connected. The maximum number of links in a random network is ½n(n−1). The mean degree $\bar{d}=(n-1)p$. The random network is homogeneous and suitable for modeling networks with approximately the same number of links for each node. The random network has several other properties, e.g., a phase transition or bond percolation (Angeles Serrano and De Los Rios, 2007; Newman et al., 2006). These properties are explored in applying FPR sequencers to prevent and repair faults. In addition to random networks, a scale-free network follows a power law degree distribution $d^{-\gamma}$, where γ is between 2.1 and 4. Systems with the structure of a scale-free network are resilient to random faults (Cohen et al., 2000) but are vulnerable to targeted attacks (Cohen et al., 2001). The structure and its inherent properties underlying a fault network affect the outcome of FPR sequencers and are an integral part of FPR.

Referring now specifically to FIGS. 1 and 2, in step 202, the failure network modeler 32 first acquires and stores in the memory 30b (or some other memory) failures data, repair resources information, a plurality of failure prevention goals, and a plurality of failure repair goals. The failures data includes an identification of the devices in the system (e.g. smart grid 20) that are in failure. In reference to the nomenclature used in connection with the example of FIGS. 3a, 3b and 3c, the failures data includes identification of root nodes ($v_r$ or $v_{r'}$) and their OUT degrees ($\delta^{OUT}$), internal nodes ($v_i$ or $v_{i'}$) and their IN and OUT degrees ($\delta^{IN}$ and $\delta^{OUT}$), leaf nodes ($v_l$ or $v_{l'}$) and their IN degrees ($\delta^{IN}$), and cause-effect connections (arcs) between the nodes. The repair resources information identifies what resources are available to address the failures. In some cases, the failure network modeler 32 cannot obtain information on repair units that are actually available, and thus "obtains" the numbers by selecting (or being preprogrammed to use) multiple values to emulate multiple scenarios for different repair unit availability situations. (See step 212). The failure prevention and failure repair goals identify the prioritization of tending toward maximizing prevention P and tending toward minimizing damage D. Further discussion regarding these goals is provided further below.

Referring again to FIG. 2, in step 204, the failure network modeler 32 defines or generates a failure network model (or simply "failure network") based on information on failures obtained in step 202 from the smart grid 20 and/or other sources 50 of failures data. Thus, for example, the failure network modeler 32 would in the example of FIGS. 3a, 3b, and 3c, generate the fault network 322 or 330 from based on failures data from the system 300 of FIG. 3a.

In step 206, the FPR sequencer 34 and/or the failure network modeler 32 determines the failure types in the networks. Failure types can, for example, be random failures, cascading failures, cascading failures with backup capacity, and a combination of these failures. As will be discussed below, the failure types affect selection of the FPR sequence.

The FPR sequencer 34 may suitably determine the failures types by analyzing relationships between and among failures in failure networks using the times and locations of failures, determining causation between and among failures, calculating the numbers of failures that occur and will occur due to causation, and determining the portion of nodes in the complex system having failures due to causation and the portion of nodes in the complex system that will have failures due to causation. Examples describing the characterization of failures is discussed further below.

In step 208, the FPR sequencer 34 generates at least one FPR sequence based on the information from steps 202, 204, 206 and further information received from the smart grid control centers 22 such as failure prevention goals and failure repair goals. In the embodiment described herein, the FPR sequencer 34 can generate FPR sequences based on various types of sequencing methods. The FPR sequencing method (also referred to as sequencer) may be distributed or centralized. The centralized FPR sequence method (or sequencer) is noted herein as FPR-C. The decentralized FPR sequencers include that with random selection (FPR-DR), one that minimizes total damage (FPR-DD), and one that maximums preventability (FPR-DP).

In at least some embodiments, the FPR sequencer 34 selects one or more of the sequencers based on the type of fault, the failure prevention goals and the failure repair goals. As discussed below in detail, different sequencers can be more advantageous in certain types of faults when fault repair (i.e. repair cost) is to be minimized. Other sequencers may be more advantageous when fault prevention is to be maximized, and/or another type of fault is present. The selection of sequencers by the FPR sequencer 34 based on these factors evolves over time as the system 10 acquires a knowledge base of sequencing methods, faults, goals, and actual results. In at least one embodiment, after step 208, the FPR sequencer 34 has generated a set of candidate FPR sequences, using one or more the FPR sequencers FPR-C, FPR-DR, FPR-DD, and FPR-DP.

Further detail on the various FPR sequencers that can be executed in step 208 are provided below.

Centralized FPR Sequencer: FPR-C

The FPR sequencer 34 may use a centralized FPR sequencer (FPR-C), which repairs one root node at a time. For each root node, the FPR-C compares the required repair resources and available repair resources. If the required repair resources are less than or equal to available repair resources, the root node is repaired; otherwise the root node is not repaired. The FPR-C has the centralized control of repairs and does not employ parallelism (simultaneous repairs of multiple root nodes). The FPR-C is expected to have the worst performance with the lower bounds (maximum D and minimum P) for the performance of all FPR sequencers.

The FPR-C sequencer:
  Step 1: Randomly select a root node $v_r$; $v_r$ has not been repaired;
  Step 2: Compare the required repair resources for $v_r$ and available repair resources;
    If the required repair resources≤available repair resources
  Step 3: Repair $v_r$;
    Else
      Go to Step 4;
  Step 4: Go to Step 1 if not all $v_r$'s are repaired; otherwise stop.

If it is determined to use the FPR-C sequencer in step 208, then the FPR sequencer 34 will perform the above-described operations multiple times to generate a plurality of candidate FPR sequences. In particular, because Step 1 involves selecting a random root node, the FPR-C sequencer can generate multiple different FPR sequences. In some implementations, such as the one discussed below in connection with FIG. 4, the FPR sequencer 34 may generate all possible FPR sequences as candidate FPR sequences. However, for large failure networks, generating and analyzing all possible FPR sequences would be computationally and time-prohibitive. Accordingly, in step 208 (when the FPR-C sequencer is used), the FPR sequencer 34 generates instead a statistically significant sample number N of different candidate sequences using the FPR-C operations described above. In other words, the FPR sequencer 34 generates N candidate sequences by executing the above operations to completion N times.

The Decentralized FPR Sequence

The FPR sequencer 34 using a decentralized sequence method generates repair sequences for multiple root nodes at the same time. The number of root nodes which can be repaired simultaneously is subject to available repair resources. There are three types of decentralized FPR sequence methods depending on how root nodes are chosen for repairs and the objective of a FPR sequencer.

The Decentralized FPR Sequencer with Random Selection: FPR-DR

The FPR sequencer 34 may use a decentralized FPR sequencer with random selection (FPR-DR) in step 208. The decentralized FPR-DR sequencer repairs multiple root nodes at the same time. The FPR-DR randomly selects root nodes for repair. When available repair resources are sufficient, the FPR-DR repairs all root nodes at the same time, which provides the best performance, i.e., the upper bound (minimum D and maximum P) for the performance of all FPR sequencers.

The FPR-DR Sequencer:
  Step 1: Randomly select a root node $v_r$; $v_r$ has not been repaired or is not being repaired;
  Step 2: Compare the required repair resources for $v_r$ and available repair resources;
    If the required repair resources≤available repair resources
  Step 3: Start to repair $v_r$;
    Else
      Go to Step 4;
  Step 4: Go to Step 1 if not all $v_r$'s are repaired or are being repaired; otherwise stop.

If it is determined to use the FPR-DR sequencer in step 208, then the FPR sequencer 34 will perform the above described operations multiple times to generate a plurality of candidate FPR sequences. Accordingly, in step 208 (when the FPR-DR sequencer is used), the FPR sequencer 34 generates instead a statistically significant sample number N of different candidate sequences using the FPR-DR operations described above. In other words, the FPR sequencer 34 generates N candidate sequences by executing the above operations to completion N times.

The Decentralized FPR Sequencer Minimizing Total Damage: FPR-DD

Figure 5:
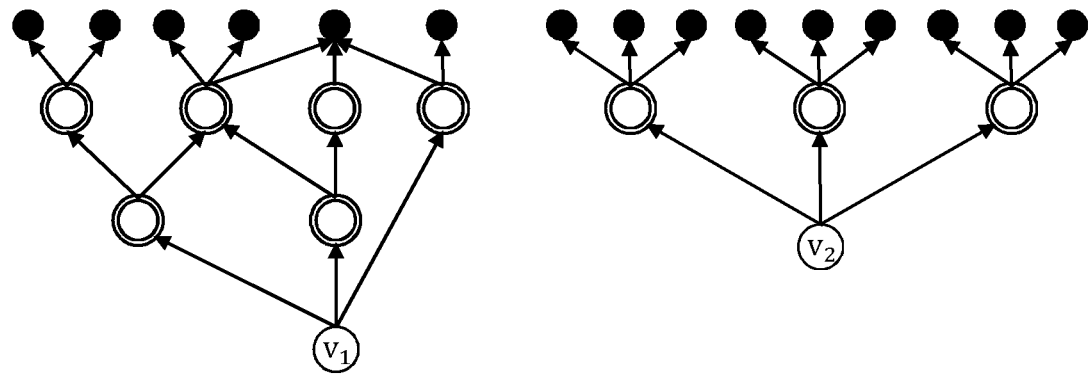
FIG. 5 shows a block diagram of yet another fault network of another different exemplary system network.

The FPR sequencer 34 in step 208 may also use the decentralized FPR sequence method (FPR-DD), which aims to minimize D for a fault network. The FPR-DD sequencer guarantees that D is minimized for a fault network comprised of disconnected components, each of which has one root node (LEMMA 1). FIG. 5 shows an example of such a fault network in which $v_2$ should be repaired before $v_1$ to minimize D because $n_2=9>n_1=6$. The condition that $m_{r/r}>>|t_{l/i/r}-t_{l'/i'/r'}|$ is common in many systems. For example, when a smart grid experiences a cascading failure, many nodes such as generators, transformers, and substations become faulty in a short period of time. To repair each faulty node, however, takes relatively long time.

The FPR-DD Sequencer:
- Step 1: Select an unrepaired root node $v_r$ such that $n_r \geq n_{r'}$ for $\forall v_{r'}$; $v_{r'}$ is unrepaired. $n_r$ and $n_{r'}$ are the number of leaf nodes $v_l$'s and $v_{l'}$'s, respectively, to which there exists at least one path from $v_r$ and $v_{r'}$, respectively. Randomly select a root node $v_r$ if there are multiple unrepaired $v_r$'s with the same $n_r$;
- Step 2: Compare the required repair resources for $v_r$ and available repair resources;
  If the required repair resources≤available repair resources
- Step 3: Repair $v_r$;
  Else
- Step 3: Go to Step 4;
- Step 4: Go to Step 1 if not all $v_r$'s are repaired or are being repaired; otherwise stop.

This process generates a sequence of nodes to be repaired, and the resources allocated thereto.

LEMMA 1: In a fault network G ($V^F$, $A^F$), $v_r$ shall be selected for repair to minimize D if there exists at least one path from $v_r$ to $n_r$ $v_l$'s and $n_r \geq n_{r'}$ for $\forall v_{r'}$; $v_r$ and $v_{r'}$ are unrepaired. $G(V^F, A^F)$ meets four conditions: (a) for $\forall v_l$, except the orphan nodes, there is only one $v_r$ such that there exists at least one path from $v_r$ to $v_l$; (b) $m_{r/r'} >> |t_{l/i/r} - t_{l'/i'/r'}|$ for $\forall v_{l/l'}$, $v_{i/i'}$, and $v_{r/r'}$; (c) $d_l \approx d_{l'}$ for $\forall v_{l/l'}$; and (d) $m_r \approx m_{r'}$ for $v_{r/r'}$.

Proof:
Let $v_r$ and $v_{r'}$ represent two root nodes in a fault network $G(V^F, A^F)$. $v_r$ is a direct or indirect cause of total $n_r$ leaf nodes $v_l$'s, $n_r > 0$; there exists at least one path from $v_r$ to any $v_l$. All $v_l$'s are repaired or prevented if and only if $v_r$ is repaired, i.e., any $v_l$ is not caused directly or indirectly by any root node other than $v_r$. The damage caused by $v_l$ over one time unit is $d_l$. The total damage caused by $v_l$'s is $$\sum_l d_l \frac{c_l - t_l + \sqrt{(c_l + t_l)^2}}{2}.$$

Suppose the difference between the times at which faults occur is much smaller than the repair time for a faulty node, i.e., $m_r >> |t_{l/i/r} - t_{l'/i'/r'}|$. Since $t_0$ represents the time at which the FPR sequence begins repairs and $t_0 \geq 0$, $m_r + t_0 >> |t_{l/i/r} - t_{l'/i'/r'}|$. Because $c_l - t_l \geq m_r + t_0$, $c_l - t_{l/i/r} - t_{l'/i'/r'}|$ for $\forall v_l$. The total damage caused by $v_l$'s is $\Sigma_l d_l (c_l - t_l)$. For $v_{r'}$, the total damage caused by $v_{l'}$'s is $\Sigma_l d_l (c_l - t_l)$; $v_{r'}$ is a direct or indirect cause of total $n_{r'}$ leaf nodes $v_{l'}$'s, $n_{r'} > 0$. Because the difference between the times at which faults occur is small, $t_{l/i/r} \approx t_{l'/i'/r'} = t$, the total damages caused by $v_l$'s and $v_{l'}$'s are $\Sigma_l d_l (c_l - t)$ and $\Sigma_l d_l (c_l - t)$, respectively. If $v_r$ is repaired before $v_{r'}$, i.e., $c_l - t = m_r$ and $c_{l'} - t = m_r + m_{r'}$, the total damage caused by $v_l$'s and $v_{l'}$'s is $n_r m_r \overline{d_l} + n_{r'} (m_r + m_{r'}) \overline{d_{l'}}$, where $\overline{d_l}$ and $\overline{d_{l'}}$ are the mean unit time damages caused by $v_l$'s and $v_{l'}$'s, respectively. If $v_{r'}$ is repaired before $v_r$, the total damage caused by $v_l$'s and $v_{l'}$'s is $n_{r'}(m_r + m_{r'}) \overline{d_l} + n_r m_r \overline{d_{l'}}$. If we further assume that $\overline{d_l} \approx \overline{d_{l'}} = \overline{d}$, $\overline{d} > 0$, and $m_r \approx m_{r'} = m_{r/r'}$, $m_{r/r'} > 0$, the total damage is $(n_r m_{r/r'} + 2 n_{r'} m_{r/r'}) \overline{d}$ if $v_r$ is repaired before $v_{r'}$, and $(2 n_r m_{r/r'} + n_{r'} m_{r/r'}) \overline{d}$ if $v_{r'}$ is repaired before $v_r$. To minimize the total damage D, $v_r$ is repaired first if $n_r > n_{r'}$; $v_{r'}$ is repaired first if $n_{r'} > n_r$; either $v_r$ or $v_{r'}$ can be repaired first if $n_r = n_{r'}$.

This Completes the Proof of LEMMA 1.

As with the other sequencers, if it is determined to use the FPR-DD sequencer in step 208, then the FPR sequencer 34 will perform the above described operations multiple times to generate a plurality of candidate FPR sequences. Accordingly, in step 208 (when the FPR-DD sequencer is used), the FPR sequencer 34 generates instead a statistically significant sample number N of different candidate sequences using the FPR-DD operations described above. In other words, the FPR sequencer 34 generates N candidate sequences by executing the above operations to completion N times.

The Decentralized FPR Sequencer 34 Maximizing Preventability: FPR-DP

Figure 6:
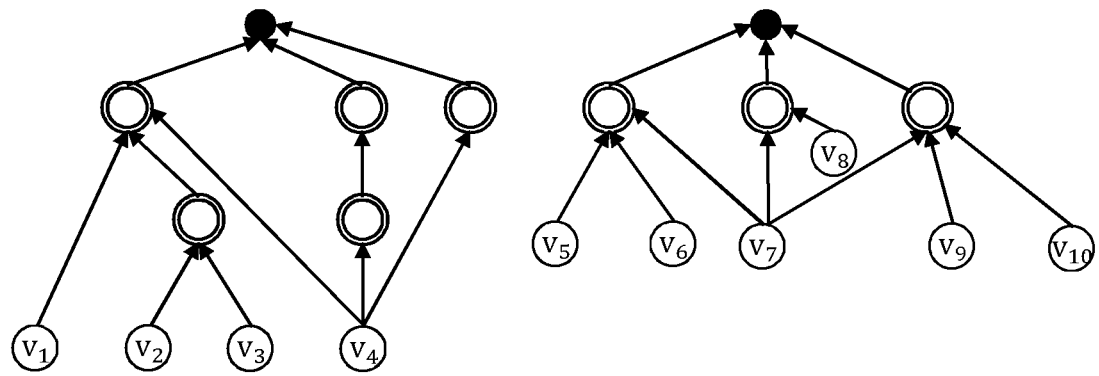
FIG. 6 shows a block diagram of still another fault network of another different exemplary system network.

The FPR sequence method (FPR-DP) executed by the FPR Sequencer 34 aims to maximize P for a fault network. The FPR-DP guarantees that P is maximized for a fault network comprised of disconnected components, each of which has one leaf node (LEMMA 2). FIG. 6 shows a fault network comprised of two disconnected components. Each component has one leaf node. In FIG. 6, $v_1$, $v_2$, $v_3$, and $v_4$ should be repaired before $v_5$, $v_6$, $v_7$, $v_8$, $v_9$, and $v_{10}$. Faults in many complex systems may be prevented. For example, most nodes become faulty almost instantaneously when a smart grid experiences a cascading failure. Some leaf nodes have backup power supply and may sustain operations for a certain period of time. Faults at these nodes may be prevented if root nodes are repaired before the backup power runs out.

The FPR-DP Sequencer:
- Step 1: Select a leaf node $v_l$, at which faults have not occurred, such that $n_l \leq n_{l'}$ for $\forall v_{l'}$; faults at $v_{l'}$ have not occurred. $n_l$ and $n_{l'}$ are the number of root nodes $v_r$'s and $v_{r'}$'s, respectively, from which there exists at least one path to $v_l$ and $v_{l'}$, respectively. Randomly select a leaf node $v_l$ if there are multiple $v_l$'s with the same $n_l$;
- Step 2: Repair all $n_l$ $v_r$'s;
- Step 3: Go to Step 1 if not all $v_l$'s are prevented; otherwise go to Step 4;
- Step 4: Randomly select a root node $v_r$; $v_r$ has not been repaired;
- Step 5: Compare the required repair resources for $v_r$ and available repair resources;
  If the required repair resources≤available repair resources
- Step 6: Repair $v_r$;
  Else
- Step 7: Go to Step 4;
- Step 8: Go to Step 4 if not all $v_r$'s are repaired or are being repaired; otherwise stop.

LEMMA 2: In a fault network G ($V^F$, $A^F$), all $n_l$ $v_r$'s shall be selected for repair to maximize P if there exists at least one path from $v_r$ to $v_l$ and $n_l \leq n_{l'}$ for $\forall v_{l'}$; faults at $v_l$ and $v_{l'}$ have not occurred. $G(V^F, A^F)$ meets three conditions: (a) for $\forall v_r$, except the orphan nodes, there is only one $v_l$ such that there exists at least one path from $v_r$ to $v_l$; (b) $t_l \approx t_{l'}$ for $\forall v_{l/l'}$; and (c) $m_r \approx m_{r'}$ for $v_{r/r'}$.

Proof:
Let $v_l$ and $v_{l'}$ represent two leaf nodes in a fault network G ($V^F$, $A^F$). Faults at $v_l$ and $V_{l'}$ have not occurred and may be prevented. $v_l$ is caused by total $n_l$ root nodes $v_r$'s, $n_l > 0$; there exists at least one path from any $v_r$ to $v_l$. $v_l$ is repaired or prevented if and only if all $n_l$ $V_r$'s are repaired. Any $v_r$ does not cause faults at other leaf nodes other than $v_l$. Similarly, $v_{l'}$ is caused by total $n_{l'}$ root nodes $v_{r'}$'s, $n_{l'} > 0$; there exists at least one path from any $v_{r'}$ to $v_{l'}$. Any $v_{r'}$ does not cause faults at other leaf nodes other than $V_{l'}$.

Repairing root nodes may be able to prevent faults at leaf nodes from occurring. Assume that $t_l \approx t_{l'} > 0$, i.e., faults at leaf nodes occur at the same time, and $m_r \approx m_{r'} > 0$, i.e., repair time for any root node is the same. Without losing generality, assume that $n_l \leq n_{l'}$. Therefore $m_r n_l \leq m_r n_{l'}$. $m_r n_l$ is the minimum required time to repair or prevent faults at $v_l$. $m_r \cdot n_{l'}$ is the minimum required time to repair or prevent faults at $v_{l'}$. $t_0$ is the time at which the FPR sequence begins repairs; $t_0 \geq t_r$ and $t_0 \geq t_{r'}$. The time at which faults at the leaf nodes occur, $t_l$ or $t_{l'}$, falls into four intervals: $t_{l/l'} < m_r \cdot n_l + t_0$, $m_r \cdot n_l + t_0 \leq t_{l/l'} < m_r \cdot n_l + t_0$, $m_r \cdot n_l + t_0 \leq t_{l/l'} < m_r \cdot n_l + m_r \cdot n_l + t_0$, and $t_{l/l'} \geq m_r \cdot n_l + m_r \cdot n_l + t_0$.

If $t_{l/l'} < m_r \cdot n_l + t_0$, $t_{l/l'} < m_r \cdot n_l + t_0$ because $m_r \cdot n_{l'}$. Neither $v_l$ nor $v_{l'}$ can be prevented. P=0. If $m_r \cdot n_l + t_0 \leq t_{l/l'} < m_r \cdot n_l + t_0$, $v_{l'}$ cannot be prevented. To maximize P, $v_r$'s are repaired before the repair of $v_{r'}$'s.

$$P = \frac{1}{|V^F|}$$

if all $n_l v_r$'s are repaired. P=0 if $v_{r'}$'s are repaired first or a mix of $v_r$'s and $v_{r'}$'s are repaired such that not all $n_l$ $v_r$'s are repaired by $t_{l/l'}$. If $m_r \cdot n_l + t_0 \leq t_{l/l'} < m_r \cdot n_l + m_r \cdot n_l + t_0$, either $v_l$ or $v_{l'}$ can be prevented, but not both.

$$P = \frac{1}{|V^F|}$$

if all $n_l$ $v_r$'s are repaired first or all $n_l v_{r'}$'s are repaired first. P=0 if a mix of $v_r$'s and $v_{r'}$'s are repaired; not all $n_l v_r$'s are repaired by time $t_{l/l'}$ and neither are $n_l v_{r'}$'s. If $t_{l/l'} \geq m_r \cdot n_l + m_r \cdot n_l + t_0$, both $v_l$ and $v_{l'}$ are prevented and $$P = \frac{2}{|V^F|}$$

regardless of the FPR sequence. In summary, repairing all $n_l$ $v_r$'s first always maximizes P.

This completes the proof of LEMMA 2.

As with the other sequencers, if it is determined to use the FPR-DP sequencer in step 208, then the FPR sequencer 34 will perform the above described operations multiple times to generate a plurality of candidate FPR sequences. Accordingly, in step 208 (when the FPR-DP sequencer is used), the FPR sequencer 34 generates instead a statistically significant sample number N of different candidate sequences using the FPR-DP operations described above. In other words, the FPR sequencer 34 generates N candidate sequences by executing the above operations to completion N times.

Referring again to the operations of FIG. 2, after the FPR sequencer 34 generates a plurality of candidate FPR sequences in step 208, the FPR sequencer 34 then emulates the plurality of candidate FPR sequences to identify one or more validated FPR sequences from the candidate FPR sequences. The emulation process includes analysis of the candidate FPR sequences (step 210) and validation of the candidate FPR sequences (step 212).

In step 210, the FPR sequencer 34 uses the failures data and the repair resources information acquired from the memory device 30b to analyze the plurality of candidate failure prevention and repair sequences generated in step 208. The FPR sequencer 34 determines and selects a set of failure prevention and repair sequences and, in some cases, associated repair resources, to achieve the plurality of failure prevention goals and the plurality of failure repair goals. The analysis includes determining the damage values D and preventability values P for each FPR sequence generated in step 208.

To this end, the FPR sequencer 34 operates on the basis of an FPR model that defines the goals of the FPR sequence. Since repair cost is the same regardless of the FPR sequence, the two objectives of FPR are to (a) minimize total damage caused by faults; and (b) prevent the maximum number of faults from occurring. The first objective reflects economic consequences of faults and the second objective reflects social impacts of faults. Damage is a financial measure whereas preventing faults indicates service quality. Two metrics are defined to measure the performance of an FPR sequencer: total damage D (D≥0) and preventability P (0≤P≤1). Let $c_j$ represent the time $v_j$ is repaired or prevented. $c_j < t_j$ indicates $v_j$ is prevented; $c_j > t_j$ indicates $v_j$ is repaired. Let $p_j$ indicate whether $v_j$ is prevented. $p_j = 0$ if $c_j > t_j$; $p_j = 1$ if $c_j < t_j$. Since time is continuous, the probability that $c_j = t_j$ is zero, i.e., $c_j \neq t_j$. Preventability P is the percentage of faults which are prevented.

$$P = \frac{\sum_{j=1}^{|V^F|} p_j}{|V^F|} \cdot p_j$$

may be expressed in a closed form:

$$p_j = \frac{c_j - t_j - \sqrt{(c_j - t_j)^2}}{2(c_j - t_j)}.$$

Let $d_l$ represent the damage caused by $v_l$ over one time unit; $d_l \geq 0$. The damage caused by $v_l$ is $d_l (c_l - t_l)(1 - p_l)$ assuming that $d_l$ is approximately the same over a short period of time $c_l - t_l$. The total damage $D = \Sigma_l d_l (c_l - t_l)(1 - p_l)$, or $\delta_l^{OUT} = 0$. The objectives of FPR are to minimize D and maximize P. The FPR problem is described as a multi-objective optimization model (Eq. (1)):

$$\min \sum_l d_l \frac{c_l - t_l + \sqrt{(c_l - t_l)^2}}{2} \quad \text{(minimize the total damage } D\text{)} \quad (1)$$

$$\max \sum_{j=1}^{|V^F|} \frac{c_j - t_j - \sqrt{(c_j - t_j)^2}}{2|V^F|(c_j - t_j)} \quad \text{(maximize the preventability } P\text{)}$$

$$\text{s.t.} \quad c_j = \max(c_{j'})$$

$$j = 1, \ldots, |V^F|; (v_{j'}, v_j) \in A^F; \delta_l^{OUT} = 0; |V^F| > 0; d_l \geq 0$$

$c_j = \max(c_{j'})$ indicates that the time at which $v_j$ ($v_l$ or $v_l$) is repaired or prevented depends on when all its direct causes $v_{j'}$'s are repaired or prevented. For $v_r$'s, $c_r$'s are determined by the FPR sequencer 34. The decision variables in Eq. (1) are $c_r$'s for $v_r$'s, which are times at which root nodes are repaired. $c_i$'s for $v_i$'s and $c_l$'s for $v_l$'s are determined by $c_r$'s. $d_l$'s, $|V^F|$, and $t_j$'s including $t_l$'s are parameters. A feasible solution to Eq. (1) is an FPR sequence that repairs all $v_r$'s. The goal is to identify efficient points, each of which achieves objective function values D and P that are together superior to what can be achieved by all other feasible solutions. Whether an FPR sequence is an efficient point depends on the parameters and topology of fault networks. Both objective functions in Eq. (1) are nonlinear and not differentiable, and constraints are nonlinear. The model in Eq. (2) rewrites Eq. (1) and admits only linear constraints, but the two objective functions remain nonlinear and not differentiable. Heuristic FPR sequencers and simulation experiments need to be developed to identify and validate efficient sequences.

$$\min \sum_l d_l \frac{c_l - t_l + \sqrt{(c_l - t_l)^2}}{2} \quad \text{(minimize the total damage } D\text{)} \tag{2}$$

$$\max \sum_{j=1}^{|V^F|} \frac{c_j - t_j - \sqrt{(c_j - t_j)^2}}{2|V^F|(c_j - t_j)} \quad \text{(maximize the preventability } P\text{)}$$

$$\min c_j \text{ (repair completion time of } v_j\text{)}$$

$$\text{s.t. } c_j \geq c_{j'}$$

$$j = 1, \ldots, |V^F|; (v_{j'}, v_j) \in A^F; \delta_l^{OUT} = 0; |V^F| > 0; d_l \geq 0$$

Figure 4:
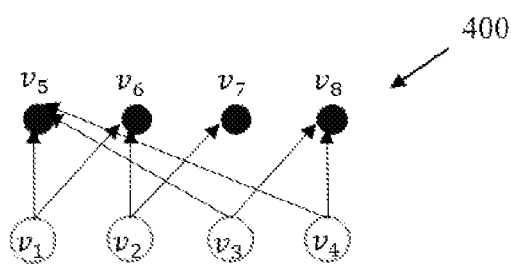
FIG. 4 shows a block diagram a fault network of a different exemplary system network.

The FPR sequencer analysis of step 210 is illustrated by way of another example of a fault network 400 shown in FIG. 4. In general, faults are repaired after they are detected and diagnosed. In many applications, repairs are more complex and less automated compared to detection and diagnostics. There are often limited resources for FPR. As the order of a fault network increases, more resources are needed to repair faults. With unlimited resources, e.g., unlimited service personnel, all root nodes are repaired simultaneously, which minimizes D and maximizes P. When resources are limited, there is a need to design efficient FPR sequencers that minimize D and maximize P.

FIG. 4 shows a fault network of $|R|=4$ root nodes $v_1$, $v_2$, $v_3$, and $v_4$, and $|L|=4$ leaf nodes $V_5$, $v_6$, $v_7$, and $v_8$. $d_5$, $d_6$, $d_7$, and $d_8$ are damage per unit time for $v_5$, $v_6$, $v_7$, and $v_8$, respectively. There are no internal nodes in FIG. 4. Let $m_r$ represent repair time for a root node $v_r$; $m_r \geq 0$. $m_1$, $m_2$, $m_3$, and $m_4$ are repair times for $v_1$, $v_2$, $v_3$, and $v_4$, respectively. There are $P_{4,4}=4!=24$ possible FPR sequences. In general, there are $|R|$-permutations of $|R|$ FPR sequences, i.e., $|R|!$ FPR sequences, for a fault network of order $|V^F|$; $|R| \leq |V^F|$. Let $t_0$ represent the time at which an FPR sequence begins repairing faults. All 24 FPR sequences and their respective D and P are summarized in Table 2.

TABLE 2

FPR Sequences, Total Damage, and Preventability for the Fault Network in FIG. 4.

| | FPR Sequence | Total Damage D | Preventability P |
|---|---|---|---|
| 1 | $v_1 \to v_2 \to v_3 \to v_4$ | $d_5 \max(m_{1,2,3,4} + t_0 - t_5, 0) +$ | $2 - \frac{|m_{1,2,3,4} + t_0 - t_5|}{2(m_{1,2,3,4} + t_0 - t_5)} -$ |
| 2 | $v_2 \to v_1 \to v_3 \to v_4$ | $d_6 \max(m_{1,2} + t_0 - t_6, 0) +$ | |
| | | $d_7 \max(m_{1,2,3} + t_0 - t_7, 0) +$ | $\frac{|m_{1,2} + t_0 - t_6|}{2(m_{1,2} + t_0 - t_6)} -$ |
| | | $d_8 \max(m_{1,2,3,4} + t_0 - t_8, 0)$ | $\frac{|m_{1,2,3} + t_0 - t_7|}{2(m_{1,2,3} + t_0 - t_7)} -$ |
| | | | $\frac{|m_{1,2,3,4} + t_0 - t_8|}{2(m_{1,2,3,4} + t_0 - t_8)}$ |
| 3 | $v_1 \to v_3 \to v_2 \to v_4$ | $d_5 \max(m_{1,2,3,4} + t_0 - t_5, 0) +$ | $2 - \frac{|m_{1,2,3,4} + t_0 - t_5|}{2(m_{1,2,3,4} + t_0 - t_5)} -$ |
| 4 | $v_3 \to v_1 \to v_2 \to v_4$ | $d_6 \max(m_{1,2,3} + t_0 - t_6, 0) +$ | |
| | | $d_7 \max(m_{1,2,3} + t_0 - t_7, 0) +$ | $\frac{|m_{1,2,3} + t_0 - t_6|}{2(m_{1,2,3} + t_0 - t_6)} -$ |
| | | $d_8 \max(m_{1,2,3,4} + t_0 - t_8, 0)$ | $\frac{|m_{1,2,3} + t_0 - t_7|}{2(m_{1,2,3} + t_0 - t_7)} -$ |
| | | | $\frac{|m_{1,2,3,4} + t_0 - t_8|}{2(m_{1,2,3,4} + t_0 - t_8)}$ |
| 5 | $v_1 \to v_2 \to v_4 \to v_3$ | $d_5 \max(m_{1,2,3,4} + t_0 - t_5, 0) +$ | $2 - \frac{|m_{1,2,3,4} + t_0 - t_5|}{2(m_{1,2,3,4} + t_0 - t_5)} -$ |
| 6 | $v_2 \to v_1 \to v_4 \to v_3$ | $d_6 \max(m_{1,2} + t_0 - t_6, 0) +$ | |
| | | $d_7 \max(m_{1,2,3,4} + t_0 - t_7, 0) +$ | $\frac{|m_{1,2} + t_0 - t_6|}{2(m_{1,2} + t_0 - t_6)} -$ |
| | | $d_8 \max(m_{1,2,3,4} + t_0 - t_8, 0)$ | $\frac{|m_{1,2,3,4} + t_0 - t_7|}{2(m_{1,2,3,4} + t_0 - t_7)} -$ |
| | | | $\frac{|m_{1,2,3,4} + t_0 - t_8|}{2(m_{1,2,3,4} + t_0 - t_8)}$ |
| 7 | $v_1 \to v_3 \to v_4 \to v_2$ | $d_5 \max(m_{1,2,3,4} + t_0 - t_5, 0) +$ | $2 - \frac{|m_{1,2,3,4} + t_0 - t_5|}{2(m_{1,2,3,4} + t_0 - t_5)} -$ |
| 8 | $v_1 \to v_4 \to v_3 \to v_2$ | $d_6 \max(m_{1,2,3,4} + t_0 - t_6, 0) +$ | |
| 9 | $v_3 \to v_1 \to v_4 \to v_2$ | $d_7 \max(m_{1,2,3,4} + t_0 - t_7, 0) +$ | $\frac{|m_{1,2,3,4} + t_0 - t_6|}{2(m_{1,2,3,4} + t_0 - t_6)} -$ |
| 10 | $v_4 \to v_1 \to v_3 \to v_2$ | $d_8 \max(m_{1,3,4} + t_0 - t_8, 0)$ | $\frac{|m_{1,2,3,4} + t_0 - t_7|}{2(m_{1,2,3,4} + t_0 - t_7)} -$ |
| | | | $\frac{|m_{1,3,4} + t_0 - t_8|}{2(m_{1,3,4} + t_0 - t_8)}$ |
| 11 | $v_1 \to v_4 \to v_2 \to v_3$ | $d_5 \max(m_{1,2,3,4} + t_0 - t_5, 0) +$ | $2 - \frac{|m_{1,2,3,4} + t_0 - t_5|}{2(m_{1,2,3,4} + t_0 - t_5)} -$ |
| 12 | $v_2 \to v_4 \to v_1 \to v_3$ | $d_6 \max(m_{1,2,4} + t_0 - t_6, 0) +$ | |
| 13 | $v_4 \to v_1 \to v_2 \to v_3$ | $d_7 \max(m_{1,2,3,4} + t_0 - t_7, 0) +$ | $\frac{|m_{1,2,4} + t_0 - t_6|}{2(m_{1,2,4} + t_0 - t_6)} -$ |
| 14 | $v_4 \to v_2 \to v_1 \to v_3$ | $d_8 \max(m_{1,2,3,4} + t_0 - t_8, 0)$ | |

TABLE 2-continued

FPR Sequences, Total Damage, and Preventability for the Fault Network in FIG. 4.

| # | FPR Sequence | Total Damage D | Preventability P |
|---|---|---|---|
| | | | $\frac{|m_{1,2,3,4} + t_0 - t_7|}{2(m_{1,2,3,4} + t_0 - t_7)} -$ |
| | | | $\frac{|m_{1,2,3,4} + t_0 - t_8|}{2(m_{1,2,3,4} + t_0 - t_8)}$ |
| 15 | $v_2 \to v_3 \to v_1 \to v_4$ | $d_5\max(m_{1,2,3,4} + t_0 - t_5, 0) +$ | $2 - \frac{|m_{1,2,3,4} + t_0 - t_5|}{2(m_{1,2,3,4} + t_0 - t_5)} -$ |
| 16 | $v_3 \to v_2 \to v_1 \to v_4$ | $d_6\max(m_{1,2,3} + t_0 - t_6, 0) +$ | |
| | | $d_7\max(m_{2,3} + t_0 - t_7, 0) +$ | $\frac{|m_{1,2,3} + t_0 - t_6|}{2(m_{1,2,3} + t_0 - t_6)} -$ |
| | | $d_8\max(m_{1,2,3,4} + t_0 - t_8, 0)$ | $\frac{|m_{2,3} + t_0 - t_7|}{2(m_{2,3} + t_0 - t_7)} -$ |
| | | | $\frac{|m_{1,2,3,4} + t_0 - t_8|}{2(m_{1,2,3,4} + t_0 - t_8)}$ |
| 17 | $v_2 \to v_3 \to v_4 \to v_1$ | $d_5\max(m_{1,2,3,4} + t_0 - t_5, 0) +$ | $2 - \frac{|m_{1,2,3,4} + t_0 - t_5|}{2(m_{1,2,3,4} + t_0 - t_5)} -$ |
| 18 | $v_3 \to v_2 \to v_4 \to v_1$ | $d_6\max(m_{1,2,3,4} + t_0 - t_6, 0) +$ | |
| | | $d_7\max(m_{2,3} + t_0 - t_7, 0) +$ | $\frac{|m_{1,2,3,4} + t_0 - t_6|}{2(m_{1,2,3,4} + t_0 - t_6)} -$ |
| | | $d_8\max(m_{2,3,4} + t_0 - t_8, 0)$ | $\frac{|m_{2,3} + t_0 - t_7|}{2(m_{2,3} + t_0 - t_7)} -$ |
| | | | $\frac{|m_{2,3,4} + t_0 - t_8|}{2(m_{2,3,4} + t_0 - t_8)}$ |
| 19 | $v_2 \to v_4 \to v_3 \to v_1$ | $d_5\max(m_{1,2,3,4} + t_0 - t_5, 0) +$ | $2 - \frac{|m_{1,2,3,4} + t_0 - t_5|}{2(m_{1,2,3,4} + t_0 - t_5)} -$ |
| 20 | $v_4 \to v_2 \to v_3 \to v_1$ | $d_6\max(m_{1,2,3,4} + t_0 - t_6, 0) +$ | |
| | | $d_7\max(m_{2,3,4} + t_0 - t_7, 0) +$ | $\frac{|m_{1,2,3,4} + t_0 - t_6|}{2(m_{1,2,3,4} + t_0 - t_6)} -$ |
| | | $d_8\max(m_{2,3,4} + t_0 - t_8, 0)$ | $\frac{|m_{2,3,4} + t_0 - t_7|}{2(m_{2,3,4} + t_0 - t_7)} -$ |
| | | | $\frac{|m_{2,3,4} + t_0 - t_8, 0|}{2(m_{2,3,4} + t_0 - t_8, 0)}$ |
| 21 | $v_3 \to v_4 \to v_1 \to v_2$ | $d_5\max(m_{1,2,3,4} + t_0 - t_5, 0) +$ | $2 - \frac{|m_{1,2,3,4} + t_0 - t_5|}{2(m_{1,2,3,4} + t_0 - t_5)} -$ |
| 22 | $v_4 \to v_3 \to v_1 \to v_2$ | $d_6\max(m_{1,2,3,4} + t_0 - t_6, 0) +$ | |
| | | $d_7\max(m_{1,2,3,4} + t_0 - t_7, 0) +$ | $\frac{|m_{1,2,3,4} + t_0 - t_6|}{2(m_{1,2,3,4} + t_0 - t_6)} -$ |
| | | $d_8\max(m_{3,4} + t_0 - t_8, 0)$ | $\frac{|m_{1,2,3,4} + t_0 - t_7|}{2(m_{1,2,3,4} + t_0 - t_7)} -$ |
| | | | $\frac{|m_{3,4} + t_0 - t_8|}{2(m_{3,4} + t_0 - t_8)}$ |
| 23 | $v_3 \to v_4 \to v_2 \to v_1$ | $d_5\max(m_{1,2,3,4} + t_0 - t_5, 0) +$ | $2 - \frac{|m_{1,2,3,4} + t_0 - t_5|}{2(m_{1,2,3,4} + t_0 - t_5)} -$ |
| 24 | $v_4 \to v_3 \to v_2 \to v_1$ | $d_6\max(m_{1,2,3,4} + t_0 - t_6, 0) +$ | |
| | | $d_7\max(m_{2,3,4} + t_0 - t_7, 0) +$ | $\frac{|m_{1,2,3,4} + t_0 - t_6|}{2(m_{1,2,3,4} + t_0 - t_6)} -$ |
| | | $d_8\max(m_{3,4} + t_0 - t_8, 0)$ | $\frac{|m_{2,3,4} + t_0 - t_7|}{2(m_{2,3,4} + t_0 - t_7)} -$ |
| | | | $\frac{|m_{3,4} + t_0 - t_8|}{2(m_{3,4} + t_0 - t_8)}$ |

In Table 2, multiple subscripts in $m_r$ represent the summation of repair times. For instance, $m_{1,2,3,4} = m_1 + m_2 + m_3 + m_4$. Some FPR sequences, e.g., the FPR sequences 1 and 2, have the same D and P. Let a pair of brackets, ⟨ ⟩, represent that a group of FPR sequences have the same D and P. There are 10 such groups in Table 2: ⟨1,2⟩, ⟨3,4⟩, ⟨5,6⟩, ⟨7,8,9,10⟩, ⟨11,12,13,14⟩, ⟨15,16⟩, ⟨17,18⟩, ⟨19,20⟩, ⟨21,22⟩, and ⟨23,24⟩. Table 3 shows the comparison for one node 6 between two groups ⟨1,2⟩ and ⟨3,4⟩. The group ⟨3,4⟩ causes more damage and has smaller preventability than ⟨1,2⟩. ⟨1,2⟩ is better than ⟨3,4⟩ in terms of both D and P, which can be expressed as ⟨1,2⟩≥⟨3,4⟩. Other comparisons among the 10 groups show that ⟨1,2⟩≥⟨5,6⟩, ⟨1,2⟩≥⟨11,12,13,14⟩, ⟨15,16⟩≥⟨3,4⟩, ⟨5,6⟩≥⟨11,12,13,14⟩, ⟨21,22⟩≥⟨7,8,9,10⟩, ⟨23,24⟩≥⟨7,8,9,10⟩, ⟨17,18⟩≥⟨19,20⟩, ⟨23,24⟩≥⟨19,20⟩, and ⟨23,24⟩≥⟨21,22⟩. Total eight out of 24 FPR sequences, or four out of 10 groups of FPR sequences, ⟨1,2⟩, ⟨15,16⟩, ⟨17,18⟩, and ⟨23,24⟩, have better performance in D and P than other FPR sequences. Depending on the values of $d_i$'s, $m_r$'s, $t_0$, and $t_i$'s, one or more of the eight FPR sequences minimize D and maximize P. This example clearly indicates that the optimal FPR sequence is determined by the structure of a fault network and parameters in FPR (Eqs. (1) and (2)). Four FPR sequencers are developed to produce various FPR sequences and they are illustrated in the next two sections.

TABLE 3

Comparison between (1,2) and (3,4).

| Comparison/Condition | Total Damage D | Preventability P |
|---|---|---|
| (3,4)-(1,2) | $d_6 \max(m_{1,2,3} + t_0 - t_6, 0) - d_6 \max(m_{1,2} + t_0 - t_6, 0)$ | $\frac{\|m_{1,2} + t_0 - t_6\|}{2(m_{1,2} + t_0 - t_6)} - \frac{\|m_{1,2,3} + t_0 - t_6\|}{2(m_{1,2,3} + t_0 - t_6)}$ |
| $t_6 < m_{1,2} + t_0$ | $d_6 m_3$ | 0 |
| $m_{1,2} + t_0 < t_6 < m_{1,2,3} + t_0$ | $d_6(m_{1,2,3} + t_0 - t_6)$ | $-1$ |
| $t_6 < m_{1,2,3} + t_0$ | 0 | 0 |

The result from step 210 is that a subset of the candidate FPR sequences developed in step 208 appear to best achieve certain goals, such as minimizing D, maximizing P, or striking a desired balance between the two, based on the stored failure prevention goals and failure damage goals.

Referring again to FIG. 2, after analyzing the FPR sequences in step 210, the FPR sequencer 34 than validates the FPR sequences in step 212. To this end, the candidate sequences are simulated or executed virtually and the results are observed and collected. In this embodiment, Monte Carlo simulations are run to execute the candidate sequences virtually. The FPR sequencer 34 compares the results of the simulations to the analytical results from step 210. For example, the FPR sequencer 34 may determine if the subset of FPR candidates selected in step 210 produce correspondingly good experimental results in the simulation of step 212, as compared to the other candidate FPR sequences.

A plurality of simulations or "experiments" are run on each candidate FPR sequence. Each of the experiments varies information that which would not be known already to the FPR sequencer 34 and FPR modeler 32. Such information can include which nodes have failures, when failures occur, total repair resources, repair resources required for each failure, and the time it takes to repair a failure. By way of example, during actual execution of the FPR sequence on the smart grid 20 of FIG. 1, additional failures can occur that would not have been used to generate the FPR sequence in step 208. Thus, the experiments can vary for variables having values not known.

Figure 7:
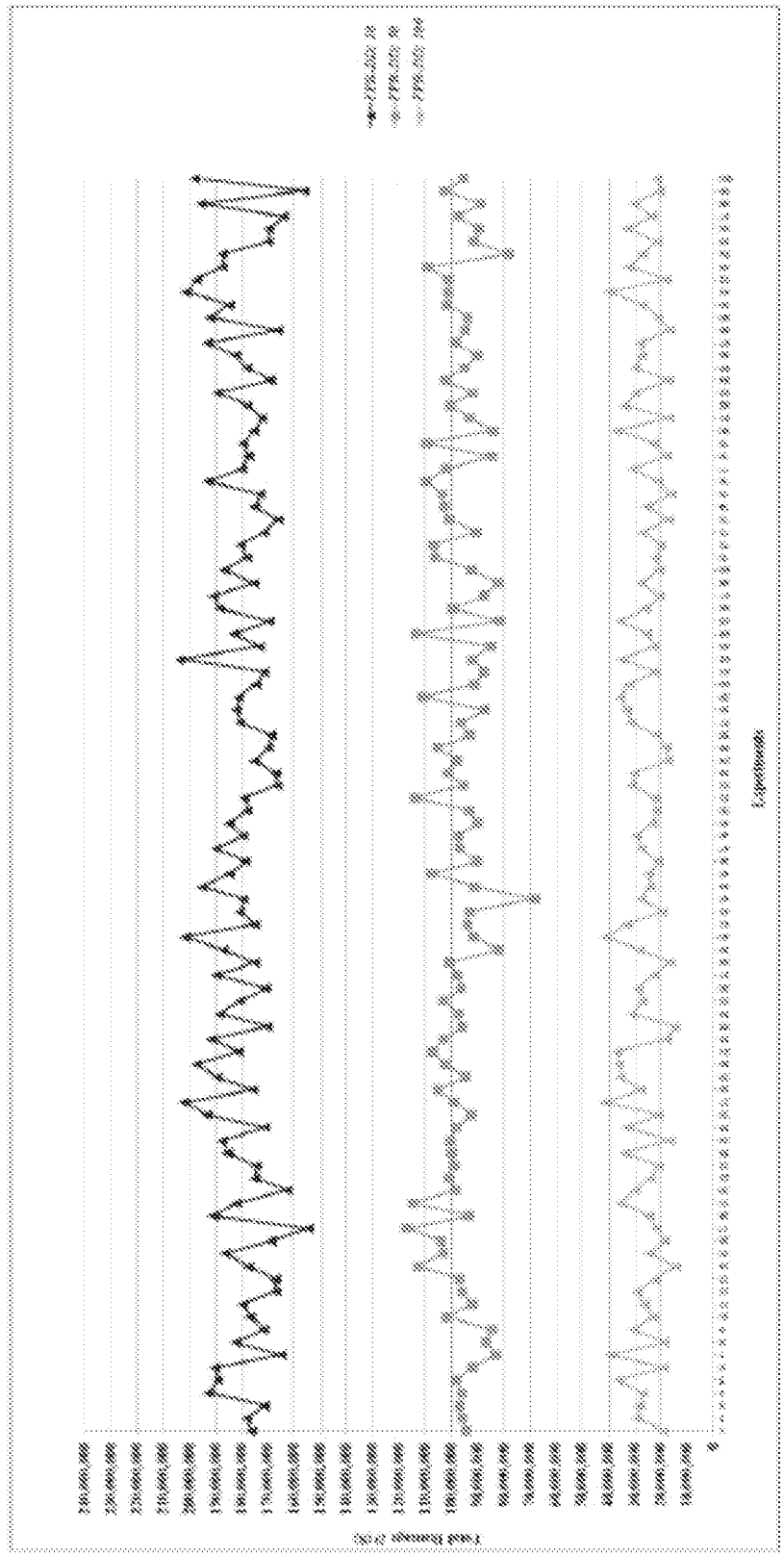
FIG. 7 shows an example of a Monte Carlo simulation of an FPR sequence developed in accordance with embodiments described herein.

The results of each simulation can be generated as a graph, as is typical in Monte Carlo simulations. FIG. 7 shows an exemplary simulation of one candidate FPR sequence in step 212. In FIG. 7, there are three graphs, each representing a different set of repair resources available. Simulating each FPR sequence for different numbers of resources available can be useful when the available resources may be varied, depending on external factors, or are not actually known. In any event, the FPR sequencer 34 uses numerical analysis (e.g. mean, standard deviation, etc.) for the purposes of evaluating the candidate FPR sequences after the simulations. The FPR sequencer 34 compares the results to the results of step 210. If each of the subset of FPR sequences generated in step 210 has consistent results in the simulation of step 212, then that sequence is validated.

The FPR sequencer 34 then provides the generated FPR sequence(s) to the display 36 for display, and/or to the communication circuit 38. The communication circuit 38 may then communicate the information to any external computing device 40 (or control center 22). Thereafter, in step 214, the control center 22 and/or computing device 40 can apply the validated set of FPR sequences and the repair resources on the smart grid 20. For example, the control center can display the generated sequence(s) and repair units can be dispatched to failure nodes of the smart grid 20 based on one of the generated sequence(s).

The FPR sequence system 30 and/or the control center 22 thereafter, in step 216, updates the failure networks and structures, the plurality of failure prevention and repair sequences, and the associated repair resources of the smart grid. To this end, the results of applying the FPR sequences in step 214 are reviewed and recorded as part of the updates.

EXPERIMENTS AND VALIDATION

To compare and validate the FPR sequencers for efficacy in different failure modes, Monte-Carlo simulation experiments (Nasiruzzaman et al., 2014) are designed and conducted using AutoMod (Applied Materials, 1988-2009). Many real-world complex systems may not satisfy conditions in LEMMA 1 or LEMMA 2. The objectives of the experiments are to examine whether (a) the FPR-C results in the highest total damage D and lowest preventability P; (b) the FPR-DD minimizes D; (c) the FPR-DP maximizes P; and (d) the FPR-DR performs better than the FPR-C but worse than the FPR-DD and FPR-PP.

Whether the FPR-DD can minimize D and the FPR-DP can maximize P depend on conditions in LEMMA 1 and LEMMA 2. In LEMMA 1, it is assumed that (a) each leaf node, except the orphan node, has only one root node; (b) nodes become faulty at almost the same time; (c) damage caused by failures at each leaf node is approximately the same; and (d) repair resources, e.g., repair personnel, required for each root node is approximately the same. In LEMMA 2, it is assumed that (a) each root node, except the orphan node, has only one leaf node; (b) all leaf nodes become faulty at almost the same time; and (c) repair resources, e.g., repair personnel, required for each root node is approximately the same.

The structure of a fault network is derived from the structure of a complex system, and rarely satisfies condition (a) in either LEMMA 1 or LEMMA 2. In general, a root node may have multiple leaf nodes and a leaf node may have multiple root nodes. Condition (b) in LEMMA 1 and LEMMA 2 specifies the type of failures in a complex system. Three types of failures, random, cascading, and cascading with backup capacity, are studied in the experiments. Most random failures are independent of each other and occur over a long period of time. Random failures do not satisfy condition (b) in either LEMMA 1 or LEMMA 2. A cascading failure in a complex system (Nedic et al., 2006) occurs in a relatively short period of time and includes multiple faults most of which are caused by a few faulty sources (root nodes in a fault network; Hoffmann and Payton, 2014). A cascading failure satisfies condition (b) because nodes become faulty almost at the same time. A cascading failure with backup capacity does not satisfy condition (b) since leaf nodes become faulty at different times depending on the amount of backup capacity each leaf node has. Conditions (c) and (d) in LEMMA 1 and condition (c) in LEMMA 2 are valid for many complex systems. A fault network's properties along the four conditions in LEMMA 1 and LEMMA 2 determine the structure of the fault network.

In each experiment, a fault network is first generated; an FPR sequencer is used to generated an FPR sequence, which is emulated to prevent and repair faults. D and P are calculated for each experiment. The experiments use the electrical power grid of the Western United States (Watts and Strogatz, 1998), which has 4,941 nodes including generators, transformers, and substations. In a simulation experiment, each node has 0.1 probability of becoming faulty. Resources required to repair failures at a root node are assumed to be randomly and uniformly distributed between 3 and 10 units. For example, to repair faults at a node may require a crew of 6 people, i.e., 6 units of resources. The damage per second caused by faults at a node is randomly and uniformly distributed between $5 and $15. Each simulation experiment emulates an FPR sequence for 24 hours.

Total repair resources affect the performance of FPR sequencers. The FPR-C repairs one root node at a time. Since the maximum amount of resources needed to repair a root node is 10 units, total repair resources for the FPR-C are 10 units, which are sufficient for the repair of any root node. The decentralized FPR sequencers, FPR-DD, FPR-DP, and FPR-DR repair multiple root nodes at the same time. The electrical power grid of the Western United States has 4,941 nodes and each nodes has 0.1 probability of having faults in the experiments. There are on average 494 nodes that become faulty in an experiment. Since only root nodes, including orphan nodes that are both root and leaf nodes, require repair, different levels of total repair resources are applied in the experiments according to the number of root nodes.

Random Failures

Many complex systems have random failures most of which occur independent of each other. In the simulation experiments, the time at which random failures occur is uniformly distributed between 0 and 86,400 seconds (24 hours=86,400 seconds). One-hundred experiments are conducted for each combination of an FPR sequencer and a certain amount of total repair resources, which are 10 units for the FPR-C. It is necessary to determine the maximum required total repair resources (MRT), which is the amount of resources sufficient to repair all root nodes simultaneously. The simulation experiments show that the maximum number of root nodes with random failures is 523 with a mean of 464 and a standard deviation of 19. Since a root node requires at most 10 units to repair, the MRT for random failures is about 5,000 units. For scalability evaluation, 14 levels of total repair resources are used in the experiments for each of the FPR-DD, FPR-DP, and FPR-DR: 10, 50, 100, 200, 300, 400, 500, 1,000, 1,500, 2,000, 2,500, 5,000, 7,500, and 10,000 units. A decentralized FPR sequencer is expected to have the best performance when total repair resources are at or greater than the MRT. The two levels, 7,500 and 10,000 units, are included in the experiments to validate the best performance of an FPR sequencer. Total 4,300 experiments (100 experiments for FPR-C+3 decentralized FPR sequencers×14 levels of total repair resources×100 experiments) are conducted to compare and validate the performance of FPR sequencers for random failures.

Table 4 summarizes experiment results, which provide several important findings for managing random failures:

(a) All decentralized FPR sequencers perform better than the FPR-C, which is a centralized FPR sequencer and has the maximum D and minimum P. At the same level of total repair resources, 10 units, all three decentralized FPR sequencers significantly decrease D and increase P compared to the FPR-C. Because Monte-Carlo simulation allows for sampling of the entire population with 100 experiments for each combination of the FPR sequencer and level of total available repair resources, statistical significant tests are not necessary and the difference shown in FIGS. 7-17 is the actual difference between the FPR sequencers;

(b) Decentralized FPR sequencers have the best performance, i.e., minimum D and maximum P, when total repair resources are at least the MRT. Note that the upper limit for P is the percentage of leaf nodes in a fault network. The experiments show that the mean and standard deviation of the percentage of leaf nodes are 0.05990 and 0.01088, respectively. The mean 0.05990 is just slightly greater than the mean for P once the performance levels off;

(c) The performance of decentralized FPR sequencers first improves as total repair resources increase, and then reaches the best performance and levels off;

(d) For total damage D, the performance of decentralized FPR sequencers levels off once repair resources reach 200 units. In other words, if total repair resources are sufficient to repair on average 6.63% (≈200/6.5/464) of all root nodes, increasing the level of repair resources further does not affect the mean or standard deviation of D;

(e) For preventability P, the performance of decentralized FPR sequencers levels off once repair resources reach 100 units. In other words, if total available repair resources are sufficient to repair on average 3.32% (≈100/6.5/464) of all root nodes, increasing the level of repair resources further does not affect the mean or standard deviation of P; and (f) The FPR-DD and FPR-DP perform almost the same, and better than the FPR-DR before the performance levels off. This experiments finding validates LEMMA 1 and LEMMA 2.

In summary, either the FPR-DD or FPR-DP should be used to sequence repairs of random failures in a complex system. Increasing total repair resources up to the amount that is sufficient to repair on average 3.32% of all root causes prevents more faults from occurring. After the amount is reached, further increasing total repair resources does not increase the number of faults prevented. Increasing total repair resources up to the amount that is sufficient to repair on average 6.63% of all root causes decreases total damage caused by faults. After the amount is reached, further increasing total repair resources does not decrease total damage.

TABLE 4

Total Damage and Preventability of Fault Networks with Random Failures.

| FPR Sequencer; Total Available Repair Resources | Total Damage D | | Preventability P | |
|---|---|---|---|---|
| | Mean | Standard Deviation | Mean | Standard Deviation |
| FPR-C | 201621025 | 10828850 | 0.00374 | 0.00280 |
| FPR-DD; 10 | 180006159 | 10313564 | 0.02169 | 0.00679 |
| FPR-DD; 50 | 96732479 | 8447916 | 0.05502 | 0.01098 |

TABLE 4-continued

Total Damage and Preventability of Fault Networks with Random Failures.

| FPR Sequencer; Total Available Repair Resources | Total Damage D | | Preventability P | |
|---|---|---|---|---|
| | Mean | Standard Deviation | Mean | Standard Deviation |
| FPR-DD; 100 | 25934287 | 6586766 | 0.05713 | 0.01023 |
| FPR-DD; 200 | 13735920 | 619541 | 0.05819 | 0.01251 |
| FPR-DD; 300 | 13830873 | 627624 | 0.05627 | 0.01033 |
| FPR-DD; 400 | 13717879 | 584635 | 0.05566 | 0.00952 |
| FPR-DD; 500 | 13758247 | 569952 | 0.05815 | 0.01138 |
| FPR-DD; 1,000 | 13630487 | 570632 | 0.05748 | 0.01032 |
| FPR-DD; 1,500 | 13830873 | 627624 | 0.05627 | 0.01033 |
| FPR-DD; 2,000 | 13630578 | 666306 | 0.05704 | 0.00973 |
| FPR-DD; 2,500 | 13758247 | 569952 | 0.05815 | 0.01138 |
| FPR-DD; 5,000 | 13630487 | 570632 | 0.05748 | 0.01032 |
| FPR-DD; 7,500 | 13830873 | 627624 | 0.05627 | 0.01033 |
| FPR-DD; 10,000 | 13675877 | 643748 | 0.05621 | 0.01009 |
| FPR-DP; 10 | 180111362 | 10611192 | 0.02233 | 0.00769 |
| FPR-DP; 50 | 96873761 | 8561127 | 0.05538 | 0.01104 |
| FPR-DP; 100 | 25867769 | 6277847 | 0.05707 | 0.01032 |
| FPR-DP; 200 | 13722287 | 621941 | 0.05825 | 0.01248 |
| FPR-DP; 300 | 13833200 | 617975 | 0.05622 | 0.01042 |
| FPR-DP; 400 | 13739117 | 637874 | 0.05608 | 0.01044 |
| FPR-DP; 500 | 13725355 | 561576 | 0.05768 | 0.01126 |
| FPR-DP; 1,000 | 13720615 | 621869 | 0.05823 | 0.01248 |
| FPR-DP; 1,500 | 13739117 | 637874 | 0.05608 | 0.01044 |
| FPR-DP; 2,000 | 13714074 | 564894 | 0.05680 | 0.01039 |
| FPR-DP; 2,500 | 13725355 | 561576 | 0.05768 | 0.01126 |
| FPR-DP; 5,000 | 13720615 | 621869 | 0.05823 | 0.01248 |
| FPR-DP; 7,500 | 13739117 | 637874 | 0.05608 | 0.01044 |
| FPR-DP; 10,000 | 13760036 | 581581 | 0.05815 | 0.01138 |
| FPR-DR; 10 | 181502337 | 10358006 | 0.00916 | 0.00472 |
| FPR-DR; 50 | 98257539 | 8680622 | 0.03252 | 0.00845 |
| FPR-DR; 100 | 27572124 | 5995100 | 0.05421 | 0.01164 |
| FPR-DR; 200 | 13731751 | 557508 | 0.05774 | 0.01137 |
| FPR-DR; 300 | 13619331 | 566126 | 0.05734 | 0.01029 |
| FPR-DR; 400 | 13719841 | 626493 | 0.05817 | 0.01243 |
| FPR-DR; 500 | 13834270 | 626768 | 0.05635 | 0.01046 |
| FPR-DR; 1,000 | 13730883 | 634684 | 0.05610 | 0.01047 |
| FPR-DR; 1,500 | 13712596 | 590669 | 0.05815 | 0.01120 |
| FPR-DR; 2,000 | 13730156 | 556901 | 0.05774 | 0.45707 |
| FPR-DR; 2,500 | 13743341 | 577436 | 0.05832 | 0.01131 |
| FPR-DR; 5,000 | 13730156 | 556901 | 0.05774 | 0.01137 |
| FPR-DR; 7,500 | 13730156 | 556901 | 0.05774 | 0.01137 |
| FPR-DR; 10,000 | 13743341 | 577436 | 0.05832 | 0.01131 |

Cascading Failures

A cascading failure may occur within a few minutes to a few hours (Andersson et al., 2005). For example, major failures in the U.S.-Canadian blackout of Aug. 14, 2003 occurred in less than an hour. In the simulation experiments, the time at which faults as part of a cascading failure occur is uniformly and randomly distributed between 42,300 and 44,100 seconds (43,200±900), i.e., faults occur within 30 minutes. The simulation experiments show that the maximum number of root nodes is 94 with a mean of 66 and a standard deviation of 9. Since a root node requires at most 10 units to repair, the MRT for a cascading failure is about 1,000 units. For scalability evaluation, 10 levels of total repair resources are used in the experiments for each of the FPR-DD, FPR-DP, and FPR-DR: 10, 50, 100, 200, 300, 400, 500, 1,000, 1,500, and 2,000 units. Total 3,100 experiments (100 experiments for FPR-C+3 decentralized FPR sequencers×10 levels of total repair resources×100 experiments) are conducted to compare and validate the performance of FPR sequencers for cascading failures.

Table 5 summarizes experiment results, which provide several important findings for managing cascading failures:

(a) The preventability P of all FPR sequencers is zero. This is often the case in a complex system where a cascading failure occurs in a short period of time and no faults may be prevented once the cascading failure begins unfolding;

(b) All decentralized FPR sequencers have smaller D than the FPR-C with the same amount of total repair resources;

(c) Decentralized FPR sequencers have the minimum D when total repair resources are at least the MRT;

(d) Decentralized FPR sequencers first decrease D as total repair resources increase, and then reaches the minimum D, which levels off once repair resources reach 500 units. In other words, if total repair resources are sufficient to repair on average 100% (≈500/6.5/66) of all root nodes in a cascading failure, increasing the level of repair resources further does not affect the mean or standard deviation of D; and (e) The FPR-DD and FPR-DP have almost the same D, which is less than that of the FPR-DR before D levels off. This experimental finding validates LEMMA 1 and LEMMA 2.

In summary, either the FPR-DD or FPR-DP should be used to sequence repairs of a cascading failure in a complex system. Increasing total repair resources up to the amount that is sufficient to repair all root nodes decreases total damage caused by faults. After the amount is reached, further increasing total repair resources does not decrease total damage. Compared to random failures, a cascading failure has less damage with the same level of total repair resources. This is because most faults in a cascading failure are caused by a few root nodes (with a mean of 66) whereas most faults in random failures are root nodes (with a mean of 464) and require repairs. In the simulation experiments, it is assumed that approximately the same number of faults (with a mean of 494) occur in random failures within 24 hours and in a cascading failure within 30 minutes. In real-world complex systems, however, these faults in random failures may occur across a much longer time period, for instance, two to three years. Total damage caused by random failures is greater but over a longer time period.

In the simulation experiments, the time at which root and internal nodes become faulty is uniformly and randomly distributed between 42,300 and 44,100 seconds, which is the same for root and internal nodes in a cascading failure without backup capacity (See above). The time at which leaf nodes become faulty is uniformly and randomly distributed between 46,800 and 86,400 seconds, i.e., leaf nodes with backup power become faulty approximately between 1 hour and 12 hours after their corresponding root nodes become faulty. The simulation experiments show that the maximum number of root nodes is 102 with a mean of 66 and a standard deviation of 9. Since a root node requires at most 10 units to repair, the MRT for a cascading failure with backup capacity is about 1,000 units. For scalability evalu-

TABLE 5

Total Damage and Preventability of Fault Networks with Cascading Failures.

| FPR Sequencer; Total Available Repair Resources | Total Damage D | | Preventability P | |
|---|---|---|---|---|
| | Mean | Standard Deviation | Mean | Standard Deviation |
| FPR-C | 190139716 | 11025184 | 0 | 0 |
| FPR-DD; 10 | 137672499 | 14383251 | 0 | 0 |
| FPR-DD; 50 | 45621092 | 7608045 | | |
| FPR-DD; 100 | 27230279 | 3718585 | | |
| FPR-DD; 200 | 18404599 | 2339505 | | |
| FPR-DD; 300 | 15184690 | 1780278 | | |
| FPR-DD; 400 | 13356829 | 1417712 | | |
| FPR-DD; 500 | 12634203 | 749992 | | |
| FPR-DD; 1,000 | 12331616 | 772317 | | |
| FPR-DD; 1,500 | 12556581 | 812326 | | |
| FPR-DD; 2,000 | 12504073 | 857407 | | |
| FPR-DP; 10 | 139356587 | 13829297 | 0 | 0 |
| FPR-DP; 50 | 44591923 | 8105005 | | |
| FPR-DP; 100 | 27451992 | 4244597 | | |
| FPR-DP; 200 | 18238043 | 2105204 | | |
| FPR-DP; 300 | 15364209 | 1846987 | | |
| FPR-DP; 400 | 13084820 | 1393448 | | |
| FPR-DP; 500 | 12647448 | 747807 | | |
| FPR-DP; 1,000 | 12471665 | 815878 | | |
| FPR-DP; 1,500 | 12484797 | 719505 | | |
| FPR-DP; 2,000 | 12434897 | 698778 | | |
| FPR-DR; 10 | 166405486 | 13711462 | 0 | 0 |
| FPR-DR; 50 | 64516423 | 11201280 | | |
| FPR-DR; 100 | 34109806 | 6667700 | | |
| FPR-DR; 200 | 19711150 | 3022102 | | |
| FPR-DR; 300 | 15668666 | 2105001 | | |
| FPR-DR; 400 | 13244631 | 1415352 | | |
| FPR-DR; 500 | 12501641 | 808187 | | |
| FPR-DR; 1,000 | 12544864 | 755824 | | |
| FPR-DR; 1,500 | 12324953 | 733180 | | |
| FPR-DR; 2,000 | 12444661 | 763936 | | |

Cascading Failures with Backup Capacity

Many critical nodes in a complex system have backup capacity in case of failures. For example, consumers in a smart grid can have backup power that provides uninterrupted power supply when there is a random failure or a cascading failure. Backup power may be fueled by gasoline, diesel, propane, natural gas, battery, and other energy sources. Some provide protection against failures and others require a short period of time, for example, 30 seconds, to resume power supply. Backup power may last for a few minutes to a few days depending on its capacity and power usage. In theory, some generators provide an endless electricity supply using natural gas from the utility company. In practice, however, these generators require periodical maintenance, for example, replacing engine oil, or cooling. There is always a limit on how long backup power can continuously supply electricity.

ation, 10 levels of total repair resources are used in the experiments for each of the FPR-DD, FPR-DP, and FPR-DR: 10, 50, 100, 200, 300, 400, 500, 1,000, 1,500, and 2,000 units. Total 3,100 experiments (100 experiments for FPR-C+3 decentralized FPR sequencers×10 levels of total repair resources×100 experiments) are conducted to compare and validate the performance of FPR sequencers for cascading failures with backup capacity.

Table 6 summarizes experiment results, which provide several important findings for managing cascading failures with backup capacity:
  (a) All decentralized FPR sequencers perform better than the FPR-C, which has the maximum D and minimum P. At the same level of total repair resources, 10 units, all three decentralized FPR sequencers significantly decrease D and increase P compared to the FPR-C;
  (b) Decentralized FPR sequencers have the best performance, i.e., minimum D and maximum P, when total repair resources are at least the MRT. The upper limit for P is the percentage of leaf nodes. The experiments show that the mean and standard deviation of the percentage of leaf nodes are 0.39720 and 0.01615, respectively. The mean 0.39720 is just slightly greater than the mean for P once the performance levels off;

(c) The performance of decentralized FPR sequencers first improves as total repair resources increase, and then reaches the best performance and levels off;

(d) For total damage D, the performance of decentralized FPR sequencers levels off once repair resources reach 500 units. In other words, if total repair resources are sufficient to repair on average 100% ($\approx$500/6.5/66) of all root nodes in a cascading failure with backup capacity, increasing the level of repair resources further does not affect the mean or standard deviation of D;

(e) For preventability P, the performance of decentralized FPR sequencers levels off once repair resources reach 300 units. In other words, if total repair resources are sufficient to repair on average 69.93% ($\approx$300/6.5/66) of all root nodes in a cascading failure with backup capacity, increasing the level of repair resources further does not affect the mean or standard deviation of P; and (f) The FPR-DD and FPR-DP perform almost the same, and better than the FPR-DR before the performance levels off. This experiments finding validates LEMMA 1 and LEMMA 2.

In summary, either the FPR-DD or FPR-DP should be used to sequence repairs of a cascading failure with backup capacity in a complex system. Increasing total repair resources up to the amount that is sufficient to repair on average 69.93% of all root nodes prevents more faults from occurring. After the amount is reached, further increasing total repair resources does not increase the number of faults prevented. Increasing total repair resources up to the amount that is sufficient to repair 100% of all root nodes decreases total damage caused by faults. After the amount is reached, further increasing total repair resources does not decrease total damage. Compared to a cascading failure without backup capacity, a cascading failure with backup capacity has lower damage with the same amount of total repair resources. The preventability of a cascading failure with backup capacity is greater than that of a cascading failure without backup capacity, which is zero regardless of the amount of repair resources. These comparison results are expected because the time that leaf nodes become faulty are delayed because of backup capacity, which reduces total damage and allows FPR sequencers to prevent more faults. Compared to random failures, a cascading failure with backup capacity has lower damage and higher preventability with the same amount of total repair resources.

TABLE 6

Total Damage and Preventability of Fault Networks with Cascading Failures and Backup Capacity.

| FPR Sequencer; Total Available Repair Resources | Total Damage D | | Preventability P | |
| --- | --- | --- | --- | --- |
| | Mean | Standard Deviation | Mean | Standard Deviation |
| FPR-C | 148373001 | 9288272 | 0.03851 | 0.01589 |
| FPR-DD; 10 | 105108343 | 11885502 | 0.14739 | 0.02841 |
| FPR-DD; 50 | 30052458 | 5563336 | 0.33118 | 0.02094 |
| FPR-DD; 100 | 17128898 | 2613894 | 0.37075 | 0.01843 |
| FPR-DD; 200 | 11367503 | 1570235 | 0.38669 | 0.01775 |
| FPR-DD; 300 | 9349344 | 1117094 | 0.39201 | 0.01617 |
| FPR-DD; 400 | 8254510 | 924284 | 0.39495 | 0.01617 |
| FPR-DD; 500 | 7799390 | 604234 | 0.39781 | 0.01431 |
| FPR-DD; 1,000 | 7636528 | 545318 | 0.39766 | 0.01628 |
| FPR-DD; 1,500 | 7689905 | 485015 | 0.39747 | 0.01575 |
| FPR-DD; 2,000 | 7773727 | 560613 | 0.39660 | 0.01593 |
| FPR-DP; 10 | 105705485 | 13271770 | 0.15372 | 0.03176 |
| FPR-DP; 50 | 29992620 | 6110029 | 0.33925 | 0.02223 |
| FPR-DP; 100 | 17395991 | 2966890 | 0.37180 | 0.01803 |
| FPR-DP; 200 | 11310111 | 1369366 | 0.38602 | 0.01781 |
| FPR-DP; 300 | 9461647 | 1230181 | 0.39217 | 0.01589 |
| FPR-DP; 400 | 8065408 | 855075 | 0.39730 | 0.01407 |
| FPR-DP; 500 | 7832061 | 657541 | 0.39407 | 0.01496 |
| FPR-DP; 1,000 | 7696657 | 505783 | 0.39449 | 0.01668 |
| FPR-DP; 1,500 | 7686924 | 512478 | 0.39678 | 0.01608 |
| FPR-DP; 2,000 | 7830611 | 567063 | 0.39358 | 0.01438 |
| FPR-DR; 10 | 127750386 | 11732134 | 0.08709 | 0.02602 |
| FPR-DR; 50 | 42927586 | 8660819 | 0.29236 | 0.03252 |
| FPR-DR; 100 | 21324304 | 4451081 | 0.35635 | 0.02123 |
| FPR-DR; 200 | 12129522 | 2007120 | 0.38216 | 0.01887 |
| FPR-DR; 300 | 9478993 | 1190272 | 0.39280 | 0.01448 |
| FPR-DR; 400 | 8176260 | 924508 | 0.39493 | 0.01764 |
| FPR-DR; 500 | 7824465 | 570546 | 0.39449 | 0.01706 |
| FPR-DR; 1,000 | 7650762 | 487693 | 0.39555 | 0.01413 |
| FPR-DR; 1,500 | 7761738 | 534957 | 0.39275 | 0.01824 |
| FPR-DR; 2,000 | 7789133 | 565894 | 0.39807 | 0.30072 |

CONCLUSIONS

Four fault prevention and repair sequencers, including a centralized sequencer, FPR-C, and three decentralized sequencers, FPR-DD, FPR-DP, and FPR-DR, are developed to sequence the prevention and repair of three different types of faults in a complex system, including random failures, cascading failures, and cascading failures with backup capacity. The FPR-DD aims to minimize total damage caused by faults. The FPR-DP aims to maximize preventability, the percentage of faults prevented from occurring.

The FPR-DR randomly selects faults for simultaneous repairs. All four FPR sequencers are implemented in a software program to generate FPR sequences, and compare and validate their performance. The electrical power grid of the Western United States is studied in total 10,500 experiments to examine the performance of the four FPR sequencers. Results show that either the FPR-DD or FPR-DP should be used to prevent and repair faults in complex systems; both sequencers minimize total damage and maximize preventability.

Total repair resources affect the performance of three decentralized FPR sequencers. Total repair resources have different thresholds for different types of failures and performance metrics. Below a threshold, increasing total repair resources improves the performance of an FPR sequencer. Above the threshold, increasing total repair resources does not further improve the performance of the FPR sequencer. The threshold of repair resources is measured as a percentage of repair resources sufficient to simultaneously repair all root nodes, which are root causes and must be repaired directly using repair resources. Below is a summary of thresholds for three types of failures:

(a) Random failures: 6.63% for total damage and 3.32% for preventability;
(b) Cascading failures: 100% for total damage. No threshold for preventability since faults are not prevented once a cascading failure begins; and
(c) Cascading failures with backup capacity: 100% for total damage and 69.93% for preventability.

In summary, to manage a cascading failure, increasing repair resources reduces total damage caused by faults until repair resources are sufficient to repair all root causes of the cascading failure. Without backup capacity for nodes to continue operating, e.g., backup power in a smart grid, faults in a cascading failure cannot be prevented since the cascading failure happens quickly before any repair may be completed. When there is backup capacity, increasing repair resources up to 69.93% of maximum required total repair resources helps prevent more faults from occurring. For random failures, only 6.63% of maximum required total repair resources are needed to minimize total damage and 3.32% of those are needed to maximize preventability.

Based on this intellectual property (IP), in practice we can develop the failure networks based on historical events of vulnerability of nodes and links in the grid network model(s) and prepare optimal alternative contingency repair plans ahead. Then, when failures occur, we can use a decision support system (DSS) developed by stake-holders based on our IP, to decide on optimal repair plans and schedules based on current information, saving computational time by referring to the above contingency plans.

The experiments results show that applying the FPR-DD and FPR-DP results in almost the same total damage and preventability, although the FPR-DD aims to minimize total damage and the FPR-DP aims to maximize preventability. The FPR-DD is developed based on LEMMA 1, which assumes that any fault has at most one root cause. The FPR-DP is developed based on LEMMA 2, which assumes that a root cause only causes at most one faulty leaf node. In real-world complex systems, these two assumptions are hardly true. A root cause may cause multiple faulty leaf nodes whereas a faulty leaf node may be caused by multiple root causes. This is a reason that the FPR-DD and FPR-DP perform almost the same. On the other hand, both perform better than the FPR-C and FPR-DR; the latter is also a decentralized FPR sequencer that randomly selects root nodes for repairs. This finding suggests that parallelism (simultaneous repairs of multiple root nodes) and FPR sequencers that take advantage of the structure of a fault network help improve the performance of FPR sequencers. Future research may develop other FPR sequencers and experiment with additional complex systems to further identify how different FPR sequencers perform in different systems.

Total repair resources significantly affect the performance of FPR sequencers up to a point. Increasing repair resources improves the performance of FPR sequencers until the amount reaches a threshold. To maximize preventability requires less resource than minimizing total damage. This observation provides an important insight for managing faults in complex systems. For instance, in a transportation system with ongoing traffic problems in certain areas, a primary objective is to prevent congestions in other areas. To resolve each traffic problem as they occur may reduce damage but may not be necessary to prevent congestions elsewhere. As long as repair resources are sufficient to resolve a certain percentage of all traffic problems (69.93% if it is a cascading failure and 3.32% if traffic problems are random failures and mostly independent), any of the three decentralized FPR sequencers can prevent the maximum number of congestions from occurring.

Another important insight regarding random failures is that only a small fraction of maximum required total repair resources, 6.63% based on the simulation experiments, is needed to minimize total damage and maximize preventability. A cascading failure may be catastrophic but it may happen relatively rarely. Most complex systems routinely experience random failures that occur sporadically over a long period of time. The simulation experiments indicate that their long term damage is higher than that of cascading failures, although the latter attract much more attention to the public for their broad impacts. It is not true that more repair resources always reduce damage caused by faults and prevent more faults from occurring. Random failures may be effectively and efficiently managed using the FPR-DD or FPR-DP with a relatively small amount of repair resources.

The simulation experiments use the electrical power grid of the Western United States to obtain the thresholds for repair resources. Additional experiments may be conducted in the future to fine tune the thresholds with more inputs from the system. Other complex systems may have different threshold values and may also be studied in the future.

REFERENCES

Alizadeh, S. and Sriramula, S., 2017, "Reliability modelling of redundant safety systems without automatic diagnostics incorporating common cause failures and process demand," *ISA Transactions*, 71, 599-614.

Anand, A. and Khots, D., 2008, "A data mining framework for identifying claim overpayments for the health insurance industry," in *Proc. of the 3rd INFORMS Workshop on Data Mining and Health Informatics*.

Andersson, G., Donalek, P., Farmer, R., Hatziargyriou, N., Kamwa, I., Kundur, P., Martins, N., Paserba, J., Pourbeik, P., Sanchez-Gasca, J., Schulz, R., Stankovic, A., Taylor, C., and Vittal, V., 2005, "Causes of the 2003 major grid blackouts in North America and Europe, and recommended means to improve system dynamic performance," *IEEE Transactions on Power Systems*, 20(4), 1922-1928.

Ang, C. C., 2006, *Optimized Recovery of Damaged Electrical Power Grids*, M. S. Thesis, Naval Postgraduate School, Monterey, California, USA.

Angeles Serrano, M. and De Los Rios, P., 2007, "Interfaces and the edge percolation map of random directed networks," *Physical Review E-Statistical, Nonlinear, and Soft Matter Physics*, 76(5), 56-121.

Applied Materials, 1988-2009, *AutoMod* 12.3.

Barabasi, A. L. and Albert, R., 1999, "Emergence of scaling in random networks," *Science*, 286(5439), 509-512.

Barabasi, A. L., 2002. *Linked: The New Science of Networks*. Cambridge, Massachusetts: Perseus Publishing.

Chen, X. W. and Nof, S. Y., 2007, "Prognostics and diagnostics of conflicts and errors over e-Work networks," in *Proc. of the 19th International Conference on Production Research*, Chile.

Chen, X. W., 2009, *Prognostics and Diagnostics of Conflicts and Errors with Prevention and Detection Logic*, Ph.D. Dissertation, Purdue University, West Lafayette, Indiana, USA.

Chen, X. W. and Nof, S. Y., 2010, "A decentralized conflict and error detection and prediction model," *International Journal of Production Research*, 48(16), 4829-4843.

Chen, X. W. and Nof, S. Y., 2012, "Conflict and error prevention and detection in complex networks," *Automatica*, 48, 770-778.

Chen, X. W. and Nof, S. Y., 2014, *Interactive Conflict Detection and Resolution for Air and Air-Ground Traffic Control*, U.S. Pat. No. 8,831,864.

Chen, X. W. and Nof, S. Y., 2015, *Interactive, Constraint-Network Prognostics and Diagnostics to Control Errors and Conflicts (IPDN)*, U.S. Pat. No. 9,009,530.

Cohen, R., Erez, K., Ben-Avraham, D., and Havlin, S., 2000, "Resilience of the Internet to random breakdowns," *Physical Review Letters*, 85, 4626-4628.

Cohen, R., Erez, K., Ben-Avraham, D., and Havlin, S., 2001, "Breakdown of the Internet under intentional attack," *Physical Review Letters*, 86, 3682-3685.

Dawande, M., Mookerjeeh, V., Sriskandarajah, C., Zhu, Y., 2011, "Structural search and optimization in social networks," *INFORMS Journal on Computing*.

Dimitrov, B., Chukova, S., and Khalil, Z., 2004, "Warranty costs: An age-dependent failure/repair model," *Naval Research Logistics*, 51(7), 959-976.

Dorogovtsev, S. N., Mendes, J. F. F., and Samukhin, A. N., 2001, "Giant strongly connected component of directed networks," *Physical Review E—Statistical, Nonlinear, and Soft Matter Physics*, 64(2), 0251011-0251014.

EPRI, 2012, Power Delivery and Utilization Research, http://portfolio.epri.com/Sector.aspx?sId=PDU, accessed in October 2018.

Erdos, P. and Renyi, A., 1959, "On random graphs," *Publicationes Mathematicae Debrecen*, 6, 290-291.

FICO, 2011, Insurance Fraud Manager, Health Care Edition, http://www.fico.com/en/Products/DNIApps/Pages/FICO-Insurance-Fraud-Manager.aspx, accessed in October 2018.

Hoffmann, H. and Payton, D. W., 2014, "Suppressing cascades in a self-organized-critical model with non-contiguous spread of failures," *Chaos, Solitons and Fractals*, 67, 87-93.

Jeong, H., 2003. Complex scale-free networks. *Physica A: Statistical Mechanics and Its Applications*, 321, 226-237.

Jin, T., Mai, N., Ding, Y., Vo, L., and Dawud, R., 2018, "Planning for distribution resilience under variable generation: Prevention, surviving and recovery," in *Proceeding of the IEEE Green Technologies Conference*, 49-56.

LaCommare, K. H. and Eto, J. H., 2004, *Understanding the Cost of Power Interruptions to U.S. Electricity Consumers*, Energy Analysis Department, Ernest Orlando Lawrence Berkeley National Laboratory, University of California Berkeley, Berkeley, California 94720.

Nasiruzzaman, A. B. M., Pota, H. R., Nahida Akter, Most., 2014, "Vulnerability of the large-scale future smart electric power grid," *Physica A: Statistical Mechanics and Its Applications*, 413, 11-24.

Nedic, D. P., Dobson, I., Kirschen, D. S., Carreras, B. A., and Lynch, V. E., 2006, "Criticality in a cascading failure blackout model," *International Journal of Electrical Power & Energy Systems*, 28(9), 627-633.

Newman, M. E. J., Barabasi, A. L., and Watts, D. J., 2006, *The Structure and Dynamics of Networks*, Princeton University Pres: Princeton, N.J.

Nof, S. Y. and Chen, X. W., 2015, Failure Repair Sequence Generation for Nodal Network, U.S. Pat. No. 9,166,907.

Nof, S. Y. and Chen, X. W., 2017, *Interactive, Constraint-Network Prognostics and Diagnostics to Control Errors and Conflicts (IPDN) Extensions*, U.S. Pat. No. 9,760,422.

Parsa, P. and Chen, X., 2013, "Diffusion of healthy behaviors in social networks," in *Proceedings of the 2013 ISERC*, San Juan, Puerto Rico.

Salmeron, J., Wood, K., and Baldick, R., 2004, "Analysis of electric grid security under terrorist threat," *IEEE Transactions on Power Systems*, 19(2), 905-912.

Sanislav, T., Zeadally, S., Mois, G. D., and Fouchal, H., 2018, "Reliability, failure detection and prevention in cyber-physical systems (CPSs) with agents," *Concurrency and Computation: Practice and Experience*, e4481.

Sim, S. H. and Endrenyi, J., 1993, "Failure-repair model with minimal and major maintenance," *IEEE Transactions on Reliability*, 42(1), 134-140.

Solomonoff, R. and Rapoport, A., 1951, "Connectivity of random nets," *Bulletin of Mathematical Biophysics*, 13, 107-117.

Watts, D. J. and Strogatz, S. H., 1998, "Collective dynamics of 'small-world' networks," *Nature*, 393, 440-442. (http://www-personal.umich.edu/~mejn/netdata/)

The invention claimed is:

1. A non-transitory computer-readable medium encoded with a computer-readable program which, when executed by a processor, will cause a computer to execute a method of managing a complex system capable of being characterized by one or more networks having nodes, the method comprising:

acquiring, and storing in a memory device, failures data, available repair resources information, a plurality of failure prevention goals, and a plurality of failure repair goals regarding the complex system; and supervising the complex system, wherein the supervising comprises:

identifying failure networks of the complex system;

determining failure types associated with the failure networks of the complex system based on causes of failures in the failure networks, the failure types including random failures, cascading failures, and cascading failures with backup capacity;

selecting at least one failure prevention and repair sequencing technique depending on the failure types associated with the failure networks, the plurality of failure prevention goals, and the plurality of failure repair goals;

generating a plurality of failure prevention and repair sequences using the selected at least one failure prevention and repair sequencing technique;

emulating the plurality of failure prevention and repair sequences, based on the failures data and the available repair resources information acquired from the memory device, (i) to determine associated repair resources to achieve the plurality of failure prevention goals and the plurality of failure repair goals and (ii) to select a set of failure prevention and repair sequences from the plurality of failure prevention and repair sequences based on the associated repair resources;

validating the set of failure prevention and repair sequences and the associated repair resources; and applying the validated set of failure prevention and repair sequences and the validated associated repair resources to the complex system, thereby managing the complex system.

2. The non-transitory storage medium of claim 1, wherein acquiring the failures data, the available repair resources information, the plurality of failure prevention goals, and the plurality of failure repair goals from the complex system comprises:

determining times at which failures occur or will occur; and identifying a quantity of available repair resources.

3. The non-transitory storage medium of claim 1, wherein identifying failure networks of the complex system comprises:

categorizing failures into leaf, internal, and root nodes; and determining all nodes and arcs that connect the nodes in failure networks.

4. The non-transitory storage medium of claim 3 wherein complex system is an electrical smart grid.

5. The non-transitory storage medium of claim 1, wherein determining failure types associated with the failure networks of the complex system comprises:

analyzing relationships between and among the failures in the failure networks using the times and locations of the failures;

determining a causation between and among the failures;

calculating the numbers of the failures that occur and will occur due to the causation;

determining a portion of nodes in the complex system having the failures due to the causation and a portion of nodes in the complex system that will have the failures due to the causation.

6. The non-transitory storage medium of claim 1, wherein generating the plurality of failure prevention and repair sequences comprises:

determining ordered lists of failures to be repaired sequentially or simultaneously; and determining repair resources and associated repair time for each failure in the ordered lists of failures.

7. The non-transitory storage medium of claim 1, wherein validating the set of failure prevention and repair sequences and the associated repair resources comprises:

executing the plurality of failure prevention and repair sequences using a computer using varying values of repair resources.

8. A non-transitory computer-readable medium encoded with a computer-readable program which, when executed by a processor, will cause a computer to execute a method of managing a complex system capable of being characterized by one or more networks having nodes, the method comprising:

acquiring, and storing in a memory device, failures data and available repair resources information, regarding the complex system; and supervising the complex system, wherein the supervising comprises:

identifying failure networks of the complex system;

determining failure types associated with the failure networks of the complex system based on causes of failures in the failure networks, the failure types including random failures, cascading failures, and cascading failures with backup capacity;

selecting at least one failure prevention and repair sequencing technique depending on the failure types associated with the failure networks;

generating a plurality of failure prevention and repair sequences using the selected at least one failure prevention and repair sequencing technique;

analyzing the generated plurality of failure prevention and repair sequences (i) to determine associated repair resources and (ii) to select at least one of the generated plurality of failure prevention and repair sequences based on the associated repair resources; and applying the selected at least one of the plurality of failure prevention and repair sequences to the complex system, thereby managing the complex system.

9. The non-transitory storage medium of claim 8, wherein the complex system comprises an electrical smart grid.

10. The non-transitory storage medium of claim 9, wherein identifying failure networks and structures of the complex system comprises:

categorizing failures into leaf, internal, and root nodes; and determining all nodes and arcs that connect the nodes in failure networks.

11. The non-transitory storage medium of claim 9, wherein determining failure types associated with the failure networks of the complex system comprises:

analyzing relationships between and among the failures in the failure networks using the times and locations of the failures;

determining a causation between and among the failures;

calculating the numbers of the failures that occur and will occur due to the causation;

determining a portion of nodes in the complex system having the failures due to the causation and a portion of nodes in the complex system that will have the failures due to the causation.

12. The non-transitory storage medium of claim 9, wherein generating the plurality of failure prevention and repair sequences includes:

a) randomly selecting a root node that has not been repaired;

b) comparing the required repair resources for the root node and available repair resources;

c) add to a first sequence to repair the root node if the required repair resources is less than or equal to the available repair resources;

d) repeat a), b), and c) if not all of the root nodes are repaired and repair required resources remain.

* * * * *